United States Patent
Alexander et al.

(10) Patent No.: US 7,650,257 B2
(45) Date of Patent: Jan. 19, 2010

(54) ENHANCED HANG-TIMER FOR CONSOLE SIMULATION

(75) Inventors: Jeffrey Michael Alexander, North Bend, WA (US); Erich T. Griebling, Seattle, WA (US)

(73) Assignee: Drop Zone Inc., North Bend, WA (US)

( * ) Notice: Subject to any disclaimer, the term of this patent is extended or adjusted under 35 U.S.C. 154(b) by 418 days.

(21) Appl. No.: 11/286,092

(22) Filed: Nov. 23, 2005

(65) Prior Publication Data

US 2006/0167649 A1    Jul. 27, 2006

Related U.S. Application Data

(63) Continuation-in-part of application No. 11/207,858, filed on Aug. 18, 2005, now Pat. No. 7,379,842.

(60) Provisional application No. 60/646,742, filed on Jan. 25, 2005.

(51) Int. Cl.
    *G01C 17/00* (2006.01)
(52) U.S. Cl. .................................................. 702/150
(58) Field of Classification Search ................ 702/141, 702/142, 149, 150, 151, 158, 166, 176; 703/6, 703/7; 463/2, 49, 50
    See application file for complete search history.

(56) References Cited

U.S. PATENT DOCUMENTS

| | | | |
|---|---|---|---|
| 4,254,731 A | 3/1981 | Taylor | 116/268 |
| 5,636,146 A | 6/1997 | Flentov et al. | 702/176 |
| 5,779,576 A * | 7/1998 | Smith et al. | 473/570 |
| 5,960,380 A | 9/1999 | Flentov et al. | 702/178 |
| 6,073,086 A * | 6/2000 | Marinelli | 702/141 |
| 6,167,356 A | 12/2000 | Squadron et al. | |
| 6,496,787 B1 | 12/2002 | Flentov et al. | 702/150 |
| 6,499,000 B2 | 12/2002 | Flentov et al. | 702/178 |
| 6,516,284 B2 | 2/2003 | Flentov et al. | 702/142 |
| 6,678,630 B1 | 1/2004 | Joder et al. | 702/139 |
| 6,856,934 B2 * | 2/2005 | Vock et al. | 702/149 |
| 7,379,842 B2 * | 5/2008 | Alexander | 702/160 |
| 7,544,137 B2 * | 6/2009 | Richardson | 473/415 |
| 2004/0201857 A1 | 10/2004 | Foxlin | 356/620 |
| 2005/0021292 A1 | 1/2005 | Vock et al. | 702/182 |
| 2005/0088301 A1 * | 4/2005 | Abbruscato | 340/539.32 |
| 2006/0000305 A1 * | 1/2006 | Payne | 74/473.1 |
| 2007/0156369 A1 * | 7/2007 | Alexander et al. | 702/127 |

* cited by examiner

*Primary Examiner*—Michael P Nghiem
(74) *Attorney, Agent, or Firm*—Woodcock Washburn LLP

(57) ABSTRACT

An enhanced hang-time evaluation mechanism is disclosed, where the mechanism is capable of providing data to a game console for simulation. Such data may correspond to the actions of an object, such as snowboarder, skier, or mountain biker, and then be simulated in a game console. The simulation of such an object may be proportional in accuracy to the types of data gathering devices employed. An accelerometer measuring hang-time via static acceleration may be used. Also, any data gathering device capable of providing spatial positioning data may be used, whether it is a compass providing orientation data, a altimeter providing altitude data, or a global positioning device providing positioning data. Such data may also be stored in a memory module, where the data may be characterized, evaluated, and then provided to the game console, regardless of whether the memory module is internal or external to the hang-time mechanism.

18 Claims, 24 Drawing Sheets

Hang-Timer Displays (Examples)

"AVERAGE Hang-Time"

"TOTAL Hang-Time"

"Current Hang-Time"

"Hang-Time History"

Pseudo Code:

Initialize Device:
- Reset HangTime
- Reset CurrentTime
- Reset BestTime
- Reset LastTime
- Reset TotalTime
- Reset DisplayDataFlag

Start:
- If DisplayData Then Goto Update Display

Request 1:
- Request Acceleration on Axis 1
- If Acceleration greater than 1/2 G
  - Goto Start

Request 2:
- Request Acceleration on Axis 2
- If Acceleration greater than 1/2 G
  - Goto Start

Request 3:
- Request Acceleration on Axis 3
- If Acceleration greater than 1/2 G
  - Goto Start

ZeroG:
- Increment HangTime
- Set DisplayData
- Goto Request1

DisplayData:
- Copy CurrentTime to LastTime
- Copy HangTime to CurrentTime
- Add HangTime Counter to TotalTime

- If HangTime Counter to TotalTime
  - Then copy HangTime to BestTime

- Display Times
- Clear DisplayDataFlag
- Goto Start

Fig. 6B

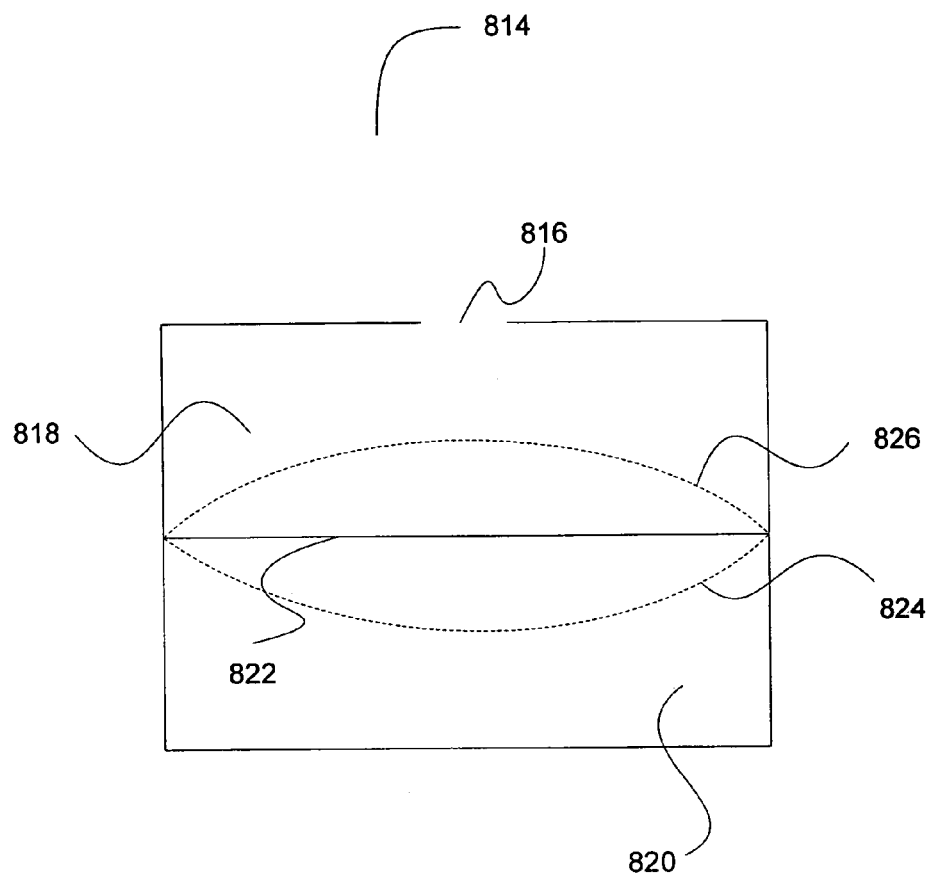
Prior Art   Fig. 8B-2

ENHANCED HANG-TIMER FOR CONSOLE SIMULATION

CROSS REFERENCE TO RELATED APPLICATIONS

This application is a continuation-in-part of U.S. application Ser. No. 11/207,858, filed Aug. 18, 2005, now U.S. Pat. No. 7,379,842, which in turn claims benefit under 35 USC 119(e) of U.S. Provisional Application Ser. No. 60/646,742, filed Jan. 25, 2005. Both applications are hereby incorporated by reference in their entirety.

BACKGROUND

Game consoles can not only display virtual events or actions, but may also provide for the ability to simulate real world events based on inputted data. For example, game consoles such as Microsoft's Xbox, Sony's PlayStation, or Nintendo's GameCube, can provide input for data and then display or simulate this data that may correspond to real world events or actions.

A hang-time determining device, with enhanced information providing capabilities, could be used to input such data to any given game console. For example, a hang-timer device could provide hang-time data, speed data, orientation data, position data, and the like. Such data would provide a game console with enough information to recreate virtually events recorded with the hang-timer in the real world. A snowboarder, a skier, or a mountain biker could wear such a hang-timer device, record his actions while wearing it, and then recreate or simulate these actions in a game console. Thus, it would be advantageous to provide a mechanism, such as an enhanced hang-timer, that could provide the relevant data to allow a game console to simulate the actions of a hang-timer wearer.

SUMMARY

A mechanism is disclosed for gathering, recording, and providing information about an object to a game console for simulation of the object in the game console. Such information can be provided either by direct connection or wirelessly. In one aspect of the presently disclosed subject matter, an accelerometer is used, where the accelerometer is configured to measure the static acceleration of the object in order to determine the hang-time of the object during a hang-time event. The accelerometer can also be configured to generate a first data for the hang-time event. In addition, a data gathering device can be used, such as an magnetometer, an altimeter, or a global positioning device, where such a device is configured to measure the spatial movement of the object during a hang-time event. The device can also be configured to generate a second data for the hang-time event. Such a first and second data can then be stored in a memory module. An output module can communicate with the memory module and communicate with a game console, such that the output module can then provide the first data and second data to the game console for simulation of the object based on a selected hang-time event or run.

In one implementation, for example, gathered data can be time stamped for a desired recreation during game console simulation. Such data can be characterized as relevant or not relevant and also be evaluated. Evaluation may entail scoring of each hang-time event or the comparison of data between two or more objects, such as snowboarders, skiers, or mountain bikers wearing the hang-timer device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 6B is pseudo code that corresponds to the flow chart of FIG. 6A;

FIG. 8B-1 illustrates the use of an altimeter in the hang-timer;

FIG. 8B-2 illustrates a typical altimeter used in the art;

FIG. 8B-3 illustrates an enhanced, resetting altimeter that allows for the measurement of altitude changes at more gradual intervals than what is typically done in the art;

FIG. 8B-4 illustrates how the enhanced altimeter can prevent a situation where a very sensitive diaphragm might become damaged or record inaccurate results;

FIG. 8B-5 illustrates one embodiment of the enhanced altimeter where a resetting aperture of the enhanced altimeter can be dammed with a porous substance;

FIG. 8B-6 illustrates another embodiment of the enhanced altimeter where the resetting aperture of the enhanced altimeter can use a capillary tube with viscous liquid to reset the reference chamber of the altimeter to ambient pressure;

FIG. 8B-7 illustrates yet another embodiment of the enhanced altimeter where the resetting aperture of the enhanced altimeter can use a flap or valve to keep resetting;

FIG. 8B-8 illustrates hysteresis of altimeter measurements, showing the disparity between ideal measurements and actual measurements;

DETAILED DESCRIPTION

Overview

At least two main aspects of the present subject matter are considered: (1) determining the time-of-flight of an object using a hang-timer, and (2) providing an enhanced hang-timer capable of interfacing with game consoles. FIGS. 1 to 7C correspond to this first aspect, and FIGS. 8A to 13 correspond to this second aspect.

Aspects of a Hang-Timer for Determining the Time-of-Flight of an Object

In one aspect of the present subject matter, mechanisms are disclosed for detecting, calculating, and displaying the time-of-flight(s) or hang-time(s) of a moving and jumping object such as, for example, a skier, snowboarder, or a mountain biker, by using, in novel ways, one or more accelerometers secured within a small wearable device. As used herein, the terms time-of-flight and hang-time are synonymous and simply refer to the amount or period of time that a selected object is not contacting or off of a surface of the earth—or any fixture attached thereto. Thus, in one aspect of the presently disclosed subject matter, a mechanism is directed to an accelerometer-based device for determining approximate time-of-flights of hang-times of a skier, snowboarder, or mountain biker who moves, jumps, and lands a plurality of times along a surface of the earth or some fixture attached thereto. A snowboarder, for example, will experience a static acceleration of (i) about 1 g when the snowboarder is contacting or on the surface, and (ii) about 0 g when the snowboarder is not contacting or off of the surface, because he or she has projected off of a jump.

Figure 1:
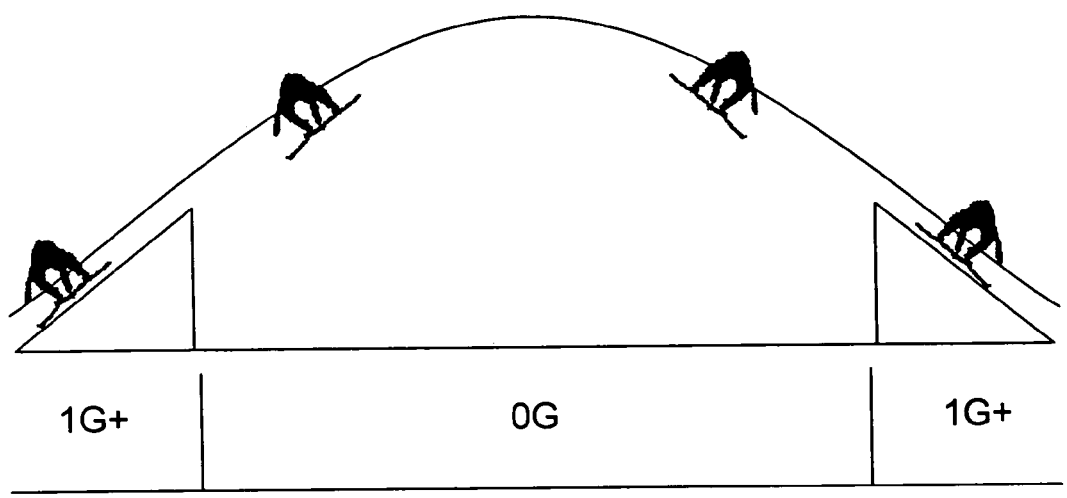
FIG. 1 is an illustration of a snowboarder (i.e., a type of jumper) moving along a surface, jumping in a trajectory, and then landing; in so doing, the snowboarder experiences a static acceleration of (i) about 1 g when he or she is contacting or on the surface and (ii) about 0 g when he or she is not contacting or off the surface.

FIG. 1 provides an exemplary illustration of a snowboarder (i.e., a type of jumper) moving along a ski slope surface, jumping in a trajectory, and then landing. By using one or more accelerometers (e.g., a tri-axis accelerometer) secured within a preferably liquid-tight housing and worn by the snowboarder (preferably near his or her center of mass), the linear or static acceleration of the snowboarder may be detected and, in turn, his or her time-of-flight or hang-time may be determined.

More specifically, the time-of-flight or hang-time of a snowboarder may be determined in accordance with the present subject matter by generating a static acceleration profile (one or more accelerometer output signals) over a period of time that includes at least one moving, jumping, and landing event; and then, appropriately analyzing the static acceleration profile.

Figure 2:
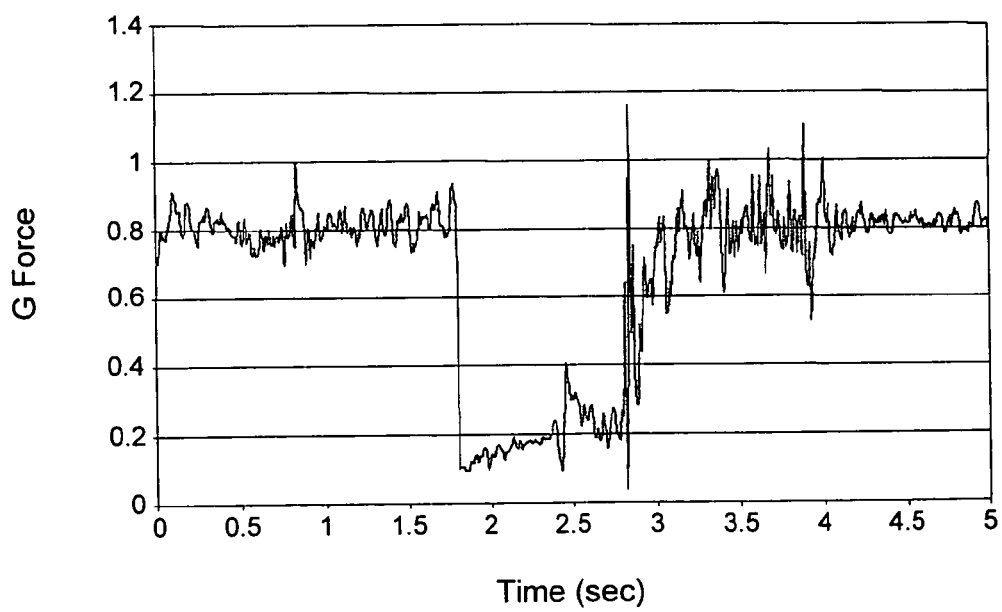
FIG. 2 is a graph showing an acceleration profile of a typical hang-time event (corresponding to the snowboarder depicted in FIG. 1), wherein the x-axis plots time in m/sec and the y-axis plots acceleration in g's.

FIG. 2 provides an exemplary graph showing the static acceleration profile (i.e., output signal of an appropriately configured tri-axis accelerometer) of the hang-time event corresponding to the snowboarder depicted in FIG. 1, where the x-axis plots time in m/sec and the y-axis plots acceleration in g's. As shown, the snowboarder experiences a static acceleration of about 1 g when he or she is moving along the surface, about 0 g's after jumping and when off of the surface, and about 1 g when he or she is again moving along the surface after landing. In view of the static acceleration profile generated by an appropriately configured and MEMS-based tri-axis accelerometer, the time of flight or hang-time of the snowboarder may be readily calculated as it corresponds to the interval or period of time when the static acceleration output signal provides a reading of about 0 g's (as opposed to about 1 g which generally corresponds to a grounded surface experience).

Alternatively, a first and second dual axis accelerometer can be configured to detect a first, second, and third static acceleration component of the object along three mutually perpendicular axes defined as an x-axis, y-axis, and z-axis respectively. In such a scenario, a static acceleration of an object over a period of time would be equal to the vector sum of the first, second and third static, acceleration components.

Figure 3:
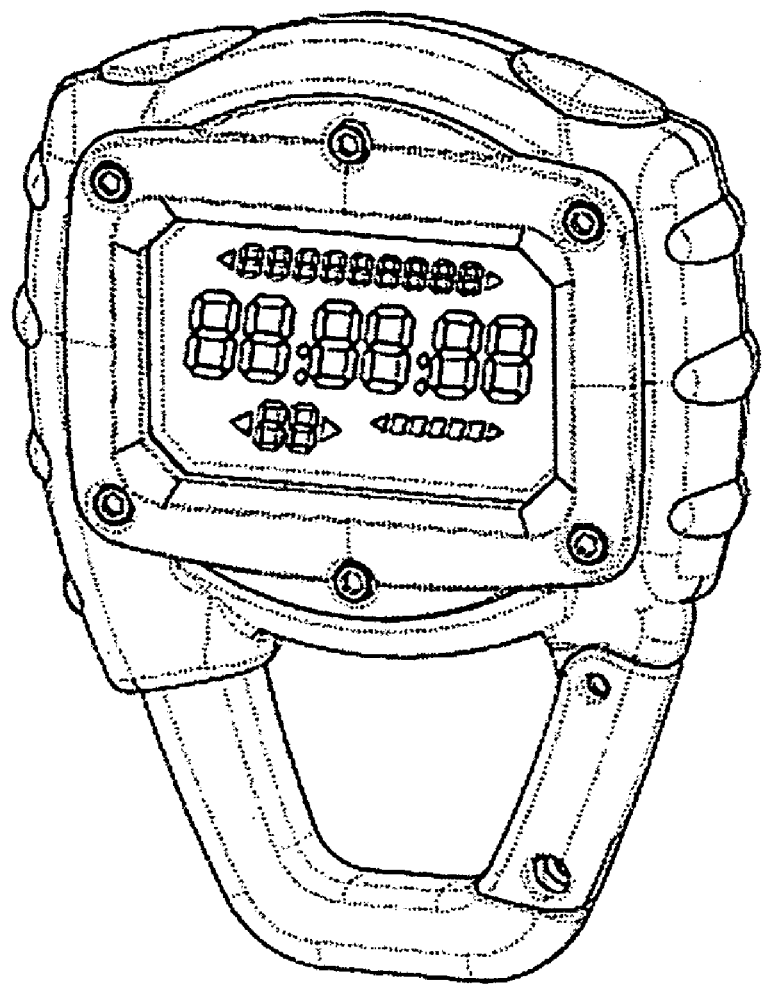
FIG. 3 is a front elevational view of a hang-timer device in accordance with an embodiment of the present subject matter.
Figure 4:
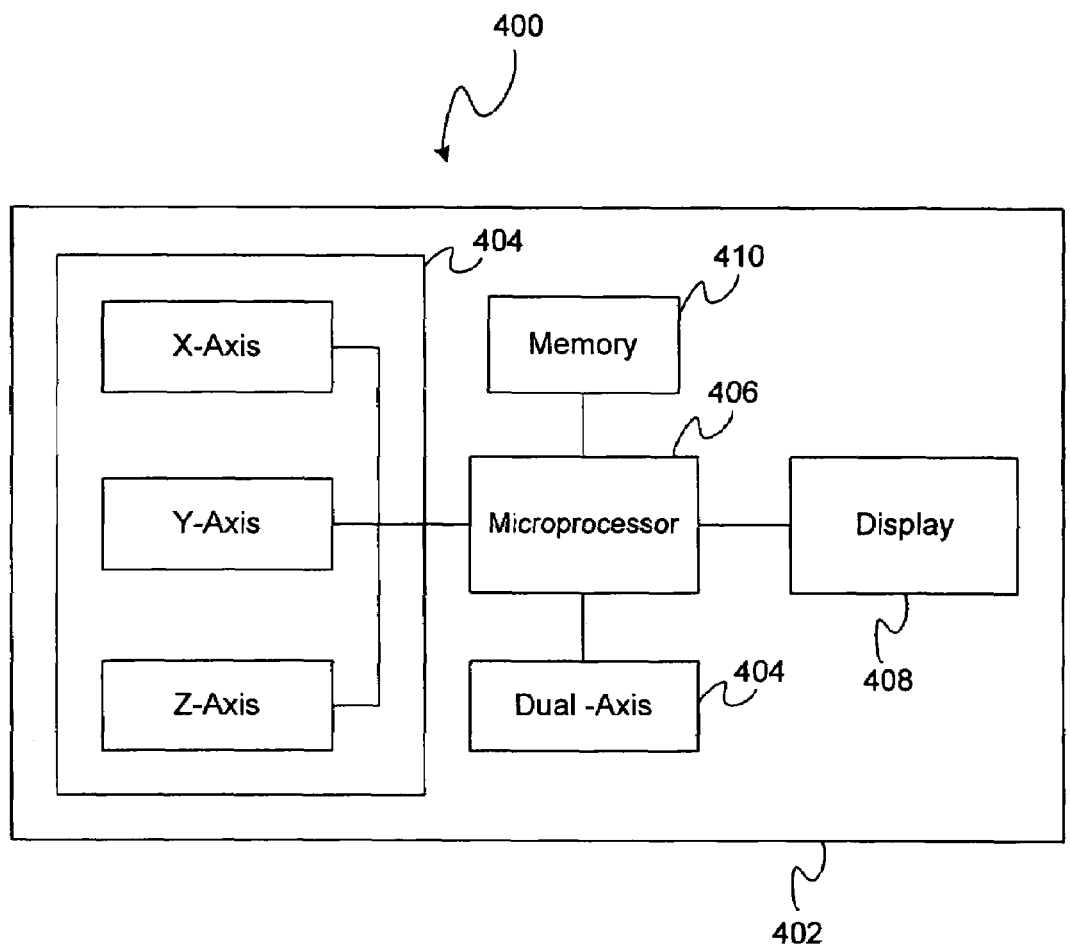
FIG. 4 is a schematic representation showing the interrelation among the various components of the hang-timer device illustrated in FIG. 3.
Figure 5A:
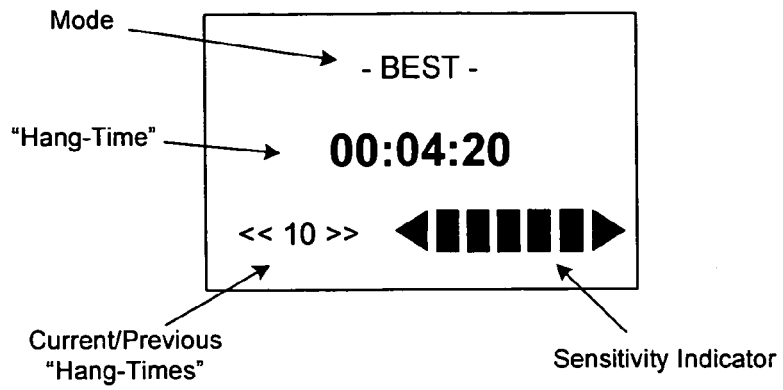
FIG. 5A illustrates a typical hang-timer display that displays the best hang-time attainted by a hang-timer wearer.
Figure 5B:
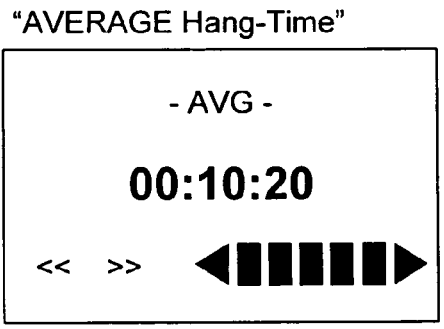
FIG. 5B illustrates the average hang-time for a hang-timer wearer, which may be the total hang-time divided by the number of jumps.
Figure 5D:
FIG. 5D illustrates the total hang-time attained by a wearer, which may be the sum of all the hang-time events—either the total per session, per day, or per any designated interval by the wearer of the hang-timer.
Figure 5C:
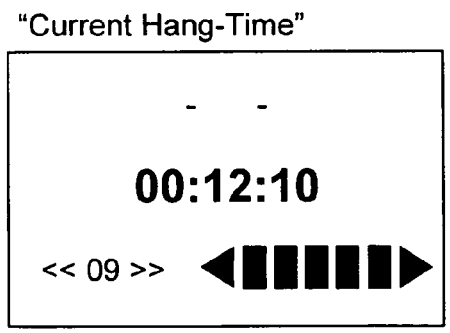
FIG. 5C illustrates a current hang-timer display, which may be the present hang-time—to be distinguished from previous hang-time events.
Figure 5E:
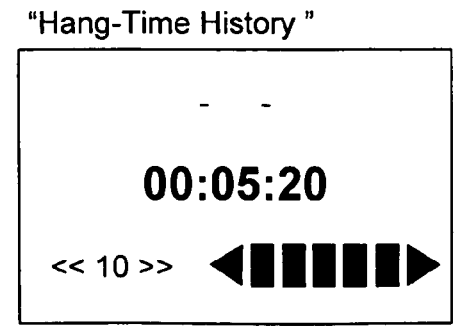
FIG. 5E illustrates the hang-time history of hang-time events, such as the tenth hang-time event out of some set of hang-time events.

Thus, and in view of the foregoing and with reference to FIGS. 3 and 4, in another aspect of the presently disclosed subject matter, a small wearable device is shown that is designed and configured to determine the approximate time-of-flight or hang-time of an object such as, for example, a skier, a snowboarder, a skater, a biker, or a jumper who moves, jumps, and lands along a surface of the earth. As shown in FIGS. 3 and 4, the device 400 comprises a housing 402; one or more accelerometers 404 (whether a dual-axis, a tri-axis, or any equivalent accelerometer) secured within the housing 402; a microprocessor 406 in electrical communication with the one or more accelerometers 404; and a display screen 408 in electrical communication with the microprocessor 406.

The housing 402 is preferably made of a two-piece rigid plastic material such as a polycarbonate. However, it may be made of a metal such as stainless steel. The housing 402 preferably encloses in an essentially liquid-tight manner the one or more accelerometers 404 and the microprocessor 406 (as well as a battery, not shown, used as the power source).

The one or more accelerometers 404 is/are preferably a single MEMS-based linear tri-axis accelerometer that functions on the principle of differential capacitance. As is appreciated by those skilled in the art, acceleration causes displacement of certain silicon structures resulting in a change in capacitance. A signal-conditioning CMOS (complementary metal oxide semiconductor) ASIC (application-specific integrated circuit) embedded and provided with the accelerometer is capable of detecting and transforming changes in capacitance into an analog output voltage, which is proportional to acceleration. The output signals are then sent to the microprocessor 406 for data manipulation and time-of-flight calculations.

In accordance with the present subject matter, the one or more accelerometers 404 are generally configured to detect the static acceleration over at least first, second, and third periods of time as the skier, snowboarder, skater, biker, or jumper (not shown) respectively moves, jumps in at least first, second and third trajectories, and lands at least first, second, and third times along the surface. In so doing, the skier, snowboarder, skater, biker, or jumper defines at least respective first, second, and third time-of-flight events.

The one or more accelerometers 404 are generally further configured to transmit at least first, second, and third accelerometer output electrical signals (not shown) that corresponds to the static acceleration of the skier, snowboarder, skater, biker, or jumper during the first, second, and third time-of-flight events. In addition, the microprocessor 406 is generally configured to calculate the approximate time-of-flight of the skier, snowboarder, skater, biker, or jumper during the first, second, and third time-of-flight events from the first, second, and third accelerometer output electrical signals respectively (which may be pulse width modulated (PWM) signals). The microprocessor 406 is generally further configured to transmit at least first, second, and third microprocessor output electrical (voltage) signals (not shown) that correspond to the calculated approximate time-of-flights of the skier, snowboarder, skater, biker, or jumper during the first, second, and third time-of-flight events.

In this regard, the microprocessor 406 is generally configured (by means of appropriate programming as is appreciated by those skilled in the art) to calculate (i) the cumulative time-of-flight associated with the first, second, and third time-of-flight events, and (ii) the greatest time-of-flight selected from the first, second, and third time-of-flight events. The microprocessor 406 is also configured to calculate (iii) the average time-of-flight of the first, second, and third time-of-flight events.

The device 400 may further comprise a memory component 410 that is in electrical communication with the microprocessor 406. The memory component 410 is generally configured to store one or more values that correspond to the approximate time-of-flights associated with the first, second, and third time-of-flight events. Moreover, the memory component 410 may be configured to store a plurality values that correspond to (i) the approximate time-of-flights associated with the first, second, and third time-of-flight events (thereby providing a history of different time-of-flights), (ii) the cumulative time-of-flight associated with the first, second, and third time-of-flight events, and (iii) the greatest time-of-flight selected from the first, second, and third time-of-flight events.

Finally, and as shown, the display screen 408 is in electrical communication with the microprocessor 406. As shown, the display screen 408 is preferably on a face of the housing 402. The display screen 408 is generally configured to display in a readable format the approximate time-of-flights associated with the first, second, and third time-of-flight events. Exemplary screen shots of several possible output displays of the display screen 408 are provided in FIGS. 5A-E.

The output displays may be liquid-crystal displays (LCDs), such as monochrome Standard LCD, with an electroluminescent backlight. The backlight can be activated when pressing a button and remain active until no buttons are pressed for several seconds. Moreover, as for the layout of the display, as is shown in FIGS. 5A-5E, the type of hang-time that can be displayed varies: it can be either the "Best" hang-time (FIG. 5A); the "Average" or "Avg" hang-time (FIG. 5B); the "Current" hang-time (FIG. 5C); the "Total" hang-time (FIG. 5D); and the "History" of hang-times (FIG. 5E), and so on.

Furthermore, the device can not only display these various times, but it can also display other information when it is used in different modes. For example, in hang-timer mode, as mentioned above, a best time, an average time, a total time, a current time, and a history of times can be displayed (additionally, as indicated above, the sensitivity of measuring hang-time can be displayed). In temperature mode, the temperature can be displayed, either in degrees Celsius or Fahrenheit, with current, low, and high temperatures. In stopwatch mode, the device provides typical features found in a stopwatch, including lap times, set times, counting times, and so on. In clock mode, the device provides typical features found in a clock or watch, including the current time, date, and so on. Finally, in set mode, the device allows the setting of times, months, years, and so on. These modes discussed above, hang-timer mode, temperature mode, stopwatch mode, clock mode, and set mode, are merely exemplary modes and other equivalent modes are provided by the device which would be apparent to any person skilled in the art.

Just as an example of one particular feature in one particular mode, the sensitivity function in the hang-timer mode allows for the adjustment of sensitivity when measuring hang-time. Thus, if the sensitivity is set on a first level, any hang-times less than 0.1 seconds are ignored. Conversely, if the sensitivity is set on a fifth level, any hang-times less than 2 seconds are ignored. Of course, there are intervening levels between the first and the fifth level, with corresponding time intervals. Furthermore, the 0.1 seconds and 2 seconds values for the first and fifth levels, respectively, are just exemplary, and may be adjusted and set differently depending on the context in which the device is used. For example, the device may have different levels of sensitivity for snowboarding than for mountain biking.

In another aspect, the present subject matter is directed to methods for determining approximate time-of-flights of a skier or snowboarder (as well as a skater, a biker, or a jumper depending on the scenario) who moves, jumps, and lands a plurality of times along a surface. The method of the present subject matter generally comprises at least the following steps: detecting by use of one or more accelerometers secured within a housing the static acceleration of a skier or snowboarder over a first period of time as the skier or snowboarder moves, jumps in a first trajectory, and lands for a first time along a surface thereby defining a first time-of-flight event; calculating from the detected static acceleration over the first period of time the approximate time-of-flight of the skier or snowboarder during the first time-of-flight event; detecting the static acceleration of the skier or snowboarder over a second period of time as the skier or snowboarder moves, jumps in a second trajectory, and lands for a second time along the surface thereby defining a second time-of-flight event; calculating from the detected static acceleration over the second period of time the approximate time-of-flight of the skier or snowboarder during the second time-of-flight event; comparing the calculated approximate time-of-flights of the skier or snowboarder over the first and second period of times, and determining one or both of (i) the cumulative time-of-flight over the first and second period of times, and (ii) the greater time-of-flight selected between the first and second time-of-flight events. The cumulative and greater time-of-flights may then be displayed on a display screen situated on a face of the device as (i) a first numeric value representative of the cumulative time-of-flight, and (ii) a second numeric value representative of the greater time-of-flight.

In further aspect of this method, the calculated approximate time-of-flights of the skier or snowboarder over the first and second period of times may be compared so as to determine (iii) the average time-of-flight over the first and second period of times. The average time-of-flight may then be displayed on the display screen as (iii) a third numeric value representative of the average time-of-flight.

In still further aspects of this method, the static acceleration of the skier or snowboarder over a third period of time is detected as the skier or snowboarder moves, jumps in a third trajectory, and lands for a third time along the surface thereby defining a third time-of-flight event. In this aspect, the additional steps comprise at least: calculating from the detected static acceleration over the third period of time the approximate time-of-flight of the skier or snowboarder during the third time-of-flight event; comparing the calculated approximate time-of-flights of the skier or snowboarder over the first, second, and third period of times, and determining (i) the cumulative time-of-flight over the first, second, and third period of times, and (ii) the greatest time-of-flight selected from the first, second, and third time-of-flight events; and displaying on the display screen (i) a fourth numeric value representative of the cumulative time-of-flight, and (ii) a fifth numeric value representative of the greatest time-of-flight. The calculated approximate time-of-flights of the skier or snowboarder over the first, second, and third period of times may then be compared to determine (iii) the average time-of-flight over the first, second, and third period of times. The average time-of-flight may then be displayed on the display screen as (iii) a sixth numeric value representative of the average time-of-flight over the first, second, and third period of times.

In yet another aspect, computer readable instructions are used for determining the time-of-flight of an object. The computer readable instructions are implemented in any type of device which might benefit from the measuring of time-of-flight, whether the device is a hang-timer device, a cellular phone, or an MP3 player. For example, a cellular phone might employ the computer readable instructions so that vital hardware is protected (shut-off or locked, as may be the case) before the cellular phone drops to the ground. Having the ability to measure changes in static acceleration may be vital in protecting such a device.

Thus, the computer readable instructions may comprise of measuring a first static acceleration and a second static acceleration using an accelerometer, and then computing a first change in magnitude from the first static acceleration to the second static acceleration, where the first change in magnitude corresponds to a take-off event of an object (for example, when the cellular phone falls out of the hands of an individual) and computing a following second change in magnitude from the second static acceleration back to the first static acceleration, where the second change in magnitude corresponds to a landing event of the object (when the cellular phone hits the ground). The same technology may be used to protect MP3 players and all other kinds of devices, whether CD players, gaming devices, and other equivalent electronic devices which may benefit from knowing beforehand when they will hit the ground.

Figure 6A:
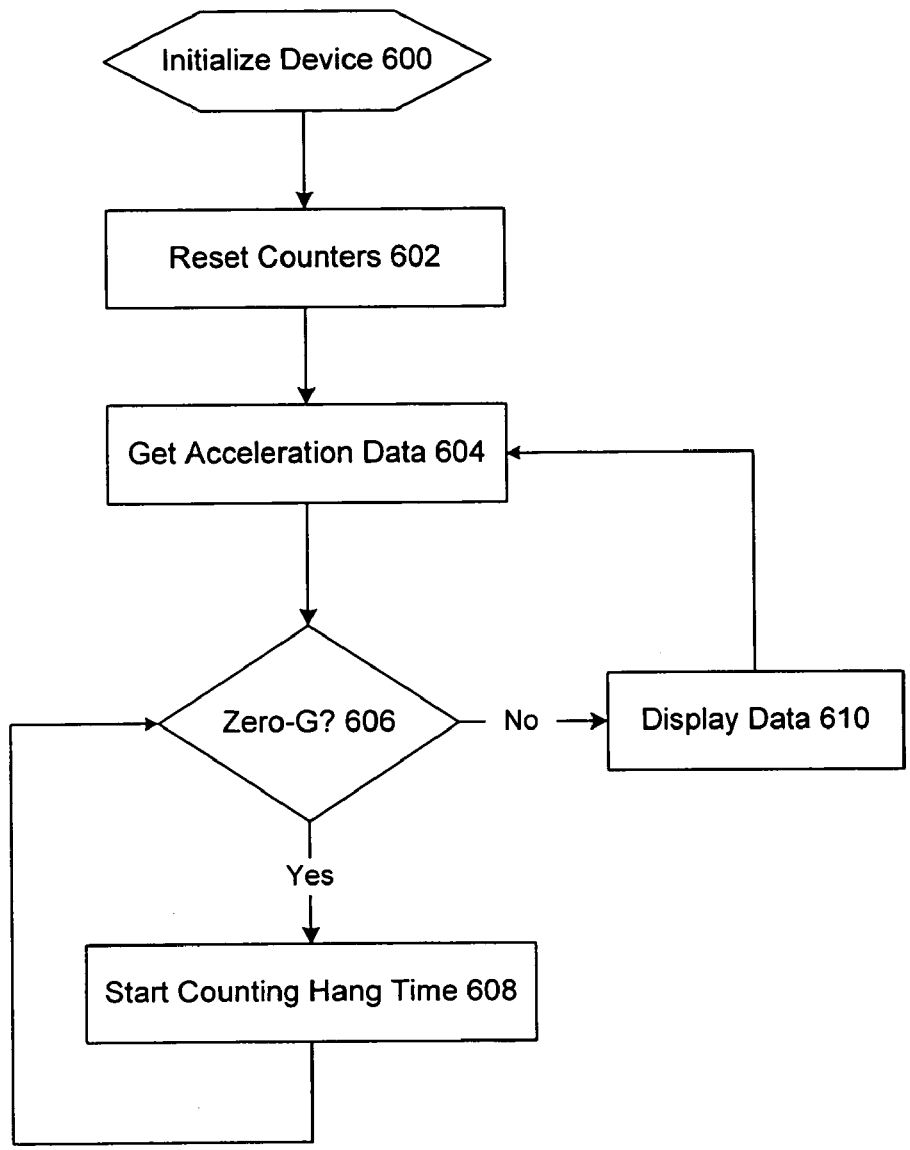
FIG. 6A is a high level flow chart that depicts certain steps associated with calculating the time-of-flight or hang-time of an object in accordance with an embodiment of the present subject matter.

A high level flow chart that depicts certain steps associated with calculating the time-of-flight or hang-time of an object in accordance with an embodiment of the present subject matter has been provided as FIG. 6A. The device is initialized 600 and any counters are reset 602. Next, the static acceleration data is gathered 604 and either there is a zero gravity condition 606 or there is not. If there is a zero gravity condition 606, the hang-time is counted 608. The hang-time is counted 608 and static acceleration data is gathered 604 until the zero gravity condition 606 does not exist anymore. Once there is no more zero gravity 606, the hang-time is displayed 610, since in such a situation a user of the device must be on the ground. Exemplary pseudo code that corresponds to the flow chart of FIG. 6A has been provided as FIG. 6B.

Figure 7B:
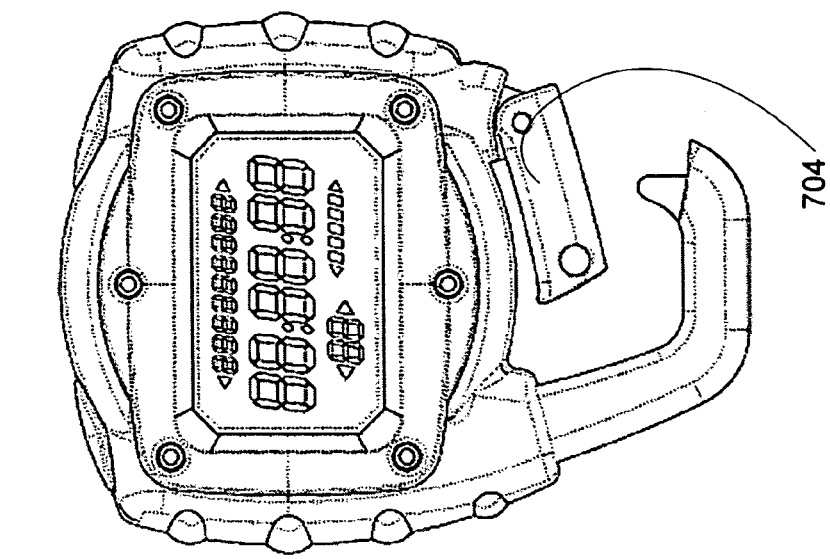
FIG. 7B illustrates the binding mechanism in the open position so that the hang-timer wearer can latch the hang-timer onto herself.
Figure 7A:
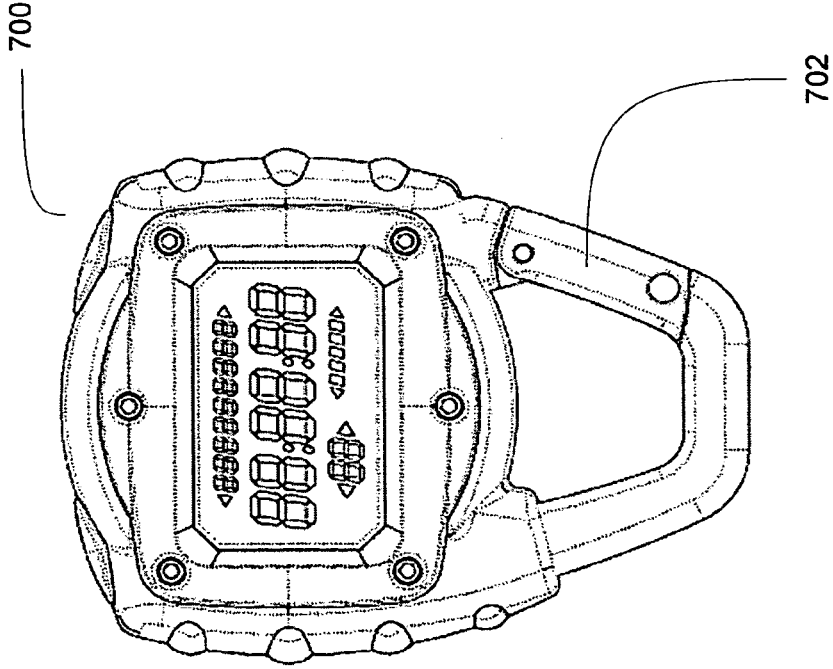
FIG. 7A illustrates a biding or latching mechanism that may be used as part of the hang-timer device.
Figure 7C:
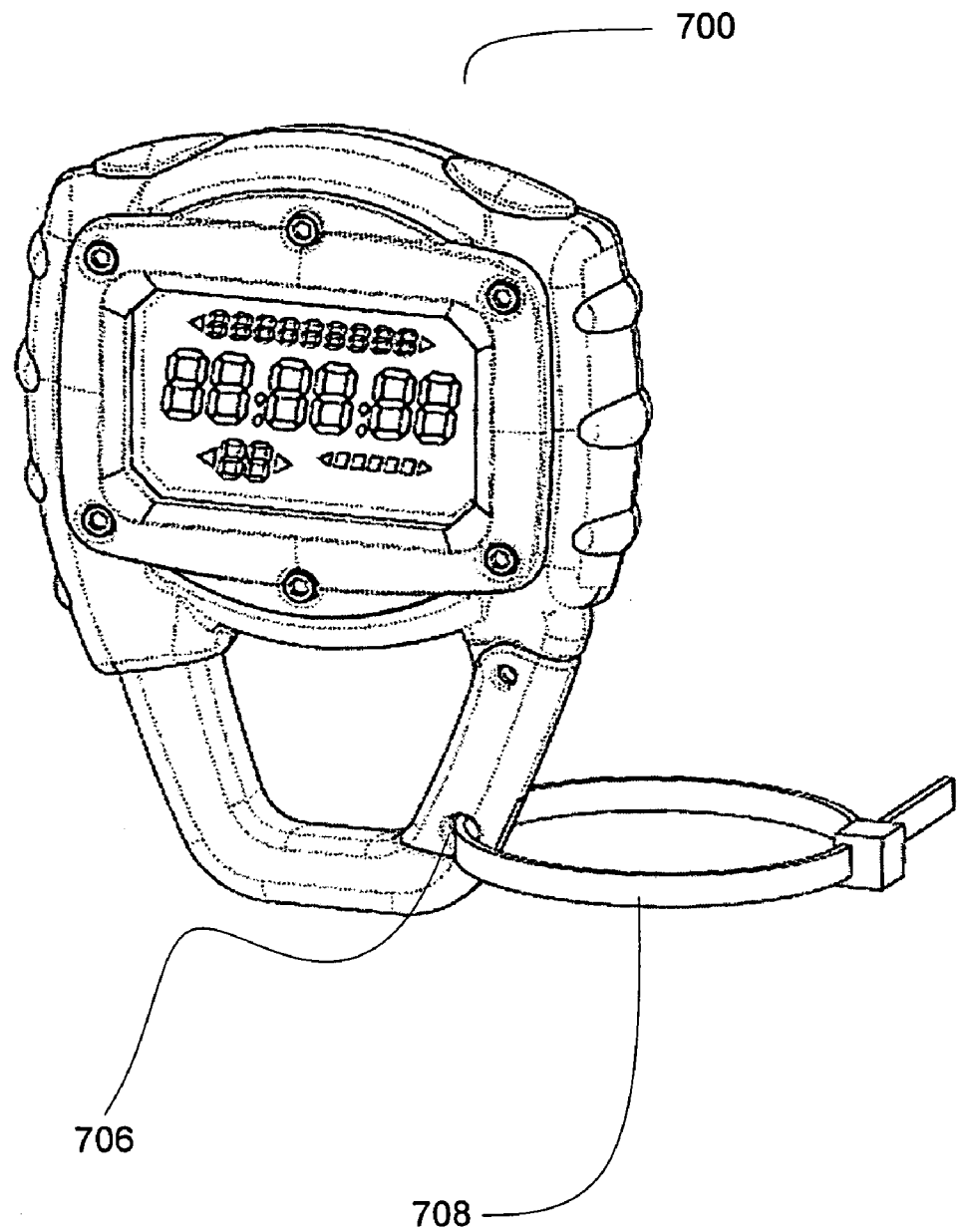
FIG. 7C illustrates a securing mechanism, in addition to the binding mechanism depicted in FIGS. 7A and 7B, in order to ensure that the hang-timer is secured to the wearer so that it cannot detached from the wearer.

In another embodiment, FIGS. 7A-7C depict a biding or latching mechanism with a securing mechanism that may be used as part of the hang-timer device. For example, FIG. 7A shows that the latching mechanism can be a carabiner clip 702, and FIG. 7B shows how that the carabiner clip opens up 704 so as to either attach the hang-timer 700 to a wearer or detach the hang-timer from a wearer. Interestingly, FIG. 7C illustrates that the securing mechanism may be a tie wrap 708. An aperture 706 in the carabiner clip allows the tie wrap 708 to secure the hang-timer 700 to a wearer. Such securing may ensure that the hang-timer is not merely thrown-up in the air to record a hang-time that was not actually obtained by the wearer. Thus, in one context, the securing mechanism may be construed as an anti-cheating mechanism, ensuring that the only hang-times that will be recorded are those actually obtained by the wearer of the hang-timer. However, the latching and securing mechanisms may be used for other purposes, as will be readily recognized by those skilled in the art.

Aspects of Enhanced Hang-Timer for Console Simulation

In another aspect of the present disclosure, the hang-timer can measure, record and provide data to a simulation environment, such as a game console. The data may be motion data, force data, and the like. Of course, those of skill in the art will appreciate that the hang-timer could not only provide "data" to the simulation environment but also "code". Thus, the hang-timer could provide just about any kind of "information" (code and/or data). In the below discussion, data is typically provided by the hang-timer, but it is understood that the hang-timer could provide any type of useful information for game simulation.

Thus, in one aspect of the presently disclosed subject matter, a snowboarder could record hang-timer data during a run and then use this recorded data to replay the run in a snowboard simulation game, such as X-Box's Amped. This aspect, therefore, combines newly available technology to record, characterize, and then re-play physical events that can be both entertaining as well as educational. In short, real events can be reviewed virtually in a simulation after downloading data to a computer or game console from a hang-timer device.

Individual hang-time events can be stored and reviewed one at a time with the hang-timer device. Hang-time events can be periods of time where internal accelerometers detect free-fall state, where the free-fall state corresponds to the time the wearer of the hang-timer is airborne—as discussed above. Since the hang-timer can store its data in terms of events, data can be characterized in a fairly straightforward manner. In other words, easy characterization can be allowed by the hang-timer's manner of storing data in the first place, namely, by relevant events, thereby obviating the need to store data that is not relevant, namely, when a hang-timer wearer is not jumping but merely standing still in place. Yet, if need be, the hang-timer does have the hardware capacity to store raw real-time data that has not been characterized as relevant or not relevant data.

Furthermore, by attaching a time stamp to any given hang-time event, a sequence of such events may be recreated in a desired temporal order, as for example, in a video game. The time stamps may either be attached in a relative manner, from hang-time event to hang-time event, or in an absolute manner, relative to some absolute point in time. Moreover, each run may have a plurality of such hang-time events, and the hang-timer may store a plurality of such runs. Those skilled in the art will readily appreciate the numerous combinations of hang-timer events and runs that might be of interest to record and then display, in a video format, by hang-timer users or wearers.

In order for the hang-timer device to properly record the relevant data, it may employ a variety of measuring devices. Aside from the accelerometers, it may employ a three axis compass, an altimeter, a GPS device, and any other such device that might provide additional data to ascertain information about a hang-timer wearer's movements (either in the air or on the ground). Such information might then be used to map a wearer's movement from real space to the virtual space of a video game.

Of course, in a simple scenario, only one of these devices need be used, for example, the accelerometer, to obtain data for an accurate simulation in a game console. For instance, jumps can be added to a simulated terrain in order to correspond to hang-time events. And, moreover, body postures and movements can be pre-planned to create a realistic simulation. Physical distances between various jumps need not be know since they can be interpolated. Nor do the speeds of the hang-timer wearer need to be known. Software can simply adjust the wearer's simulated speeds and distances to meet the hang-time events.

However, in a more complicated scenario, various such devices described above are in fact used. Such additional devices provide data that yields wearer orientation information, speed, position, and so on. For example, a digital compass may be used that provides orientation information of a hang-timer wearer with respect to the earth. This orientation metric can be easily measured with a three axis digital compass. Such a digital compass may consist of two or more magnetometers. A magnetometer is an instrument used to measure the strength of the earth's magnetic fields. Two magnetometers perpendicular to each other are commonly used to measure orientation relative to earth's magnetic North. Accurate measurements from such a compass require the plane defined by its two axes be parallel to a plane tangent to the surface of the earth. However, a three axis magnetometer, such as that which can be used with the hang-timer, can measure its orientation to the earth through the earth's magnetic field without any orientation restrictions.

Figure 8A:
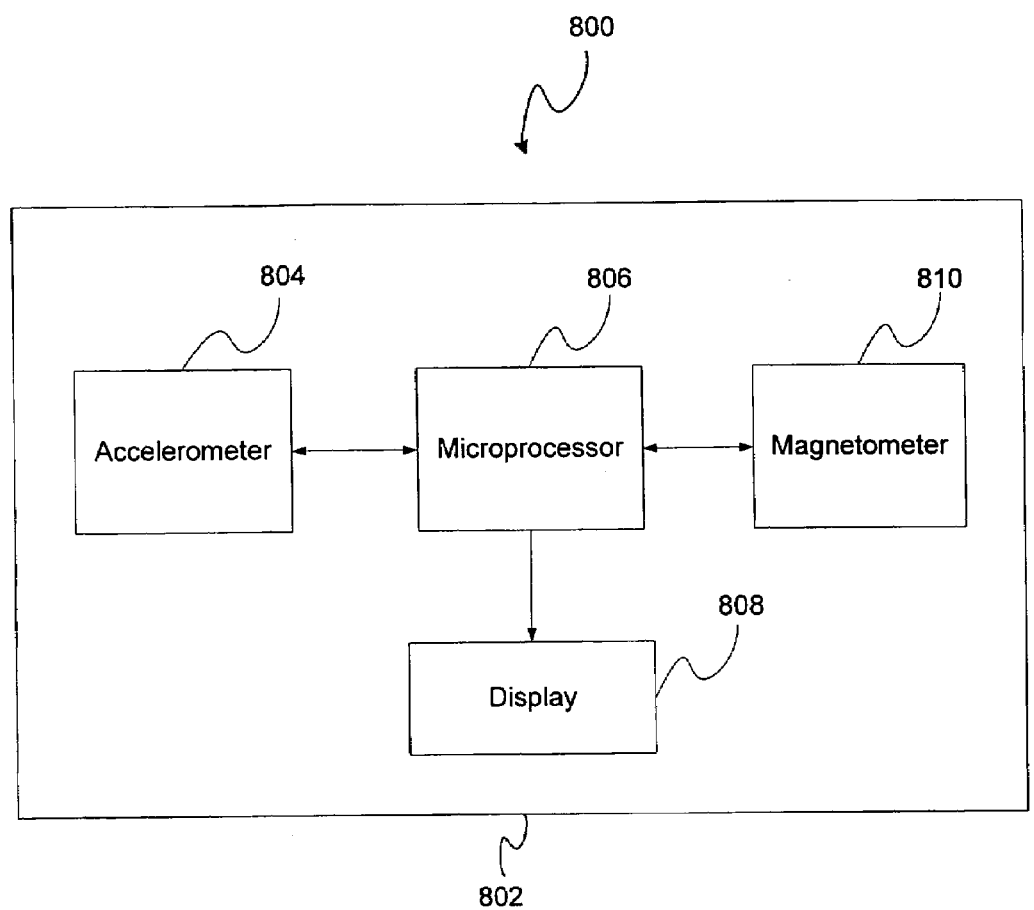
FIG. 8A illustrates a hang-timer with a magnetometer for measuring orientation of a wearer of the hang-timer.

Thus, in FIG. 8A a hang-timer device 800 is depicted with a magnetometer 810 for measuring orientation of a wearer of the hang-timer 800. Such orientation measurements can be used in game console simulation in order to provide more realistic depiction of the kind of jumps made by a hang-timer wearer.

The magnetometer 810 is electrically coupled to a microprocessor 806, where it provides data to the microprocessor 806 which can then be processed and the orientation of a hang-timer wearer can be determined. Also, data from an accelerometer 804 is provided to the microprocessor 806 to determine the hang-time for a wearer. Hang-time data and orientation data provide enough information to determine the length and physical orientation of a hang-timer wearer. Additionally, as before depicted in FIG. 4, a display 808 is provided in the housing 802 of the device 800 to provide any desired information that was processed by the microprocessor 806.

Interestingly, absolute wearer orientation relative to the earth need not be known. Rather, relative changes in wearer orientation can be used if a change happens during a hang-time event. For example, if a snowboarder's change in orientation is about 180 degrees while airborne, then software can rotate a simulated rider in a video game so that the rider is facing about 180 degrees relative to his takeoff orientation.

Furthermore, several assumptions can be made regarding user posture. Assuming angular momentum is conserved during a hang-time event, then measured changes in rate of angular velocity during an event can be inferred as a change in posture of the wearer. Just as a pirouetting ice skater changes the rate of angular rotation be extending or retracting his or her arms, a snowboarder changes angular rotation while airborne. Software can simulate this phenomenon and increase the realism of simulations by changing the posture and/or arm position of the wearer accordingly.

Next, in addition to magnetometer sensors, altimeter sensors can also be used. Altimeter sensors are pressure sensors and they can be sensitive to fluctuations in barometric pressures. For this reason, they tend not to be accurate over long periods of time. Also, the resolution of a common altimeter tends to be limited to gradations of about 3 feet. However, the rate of change of these sensors can be measured over short period of time to determine whether an altimeter user (which could be a hang-timer wearer, if the hang-timer has such a build-in altimeter) is increasing or decreasing in altitude. And, absolute altitude need not be known. Knowing relative altitude difference between takeoff and landing and during a hang-timer event, when a wearer reaches the apex of his or her trajectory, can enable the software to make assumptions about the speed at takeoff.

For example, a rate altimeter can provide minimum speed information. Such speed information may convey at the very least vertical accent and decent rates. With this information at hand, more accurate simulations can be obtained by making real world assumptions about a user's behavior. For instance, such assumptions may correspond to typical horizontal rates of a user on a given surface, or, furthermore, they may correspond to the type of terrain a user would find himself in (i.e., the types of jumps the user would make).

One type of jump a user could make is jumping off of a cliff, where a user would experience mainly (but not exclusively) a downward trajectory. In such a scenario, the altimeter may record zero (or minimal) change in altitude at the start of a hang-time event—that is, when the user has just left the surface supporting him (whether the surface comprises the earth, a ramp, or any equivalent thereof). Another type of jump a user could make is jumping off of an inclined terrain, where the user first experiences an upward trajectory and then a downward trajectory as user falls back to the surface. These different types of jumps will invoke different horizontal rate assumptions. These horizontal rate assumptions combined with altimeter-provided vertical rates can add a significant degree of realism to game simulation (or any simulation) by using at least some altimeter derived speed information.

Figures 1, 8B:
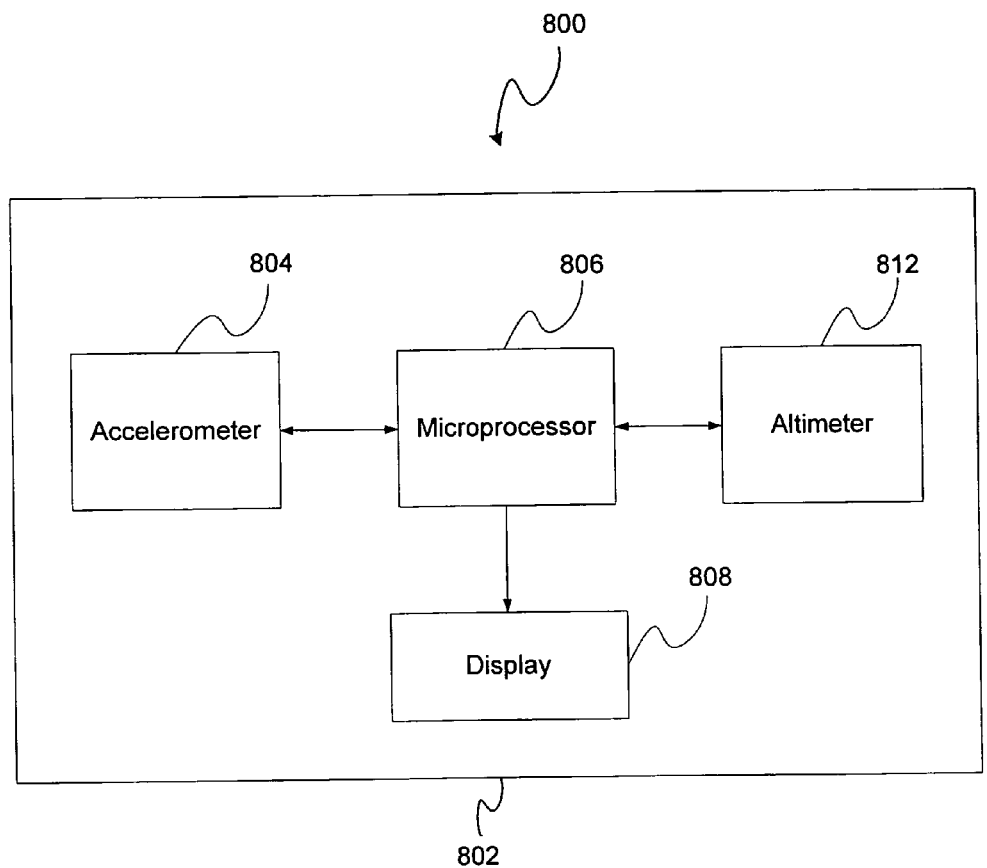
Figures 3, 8B:
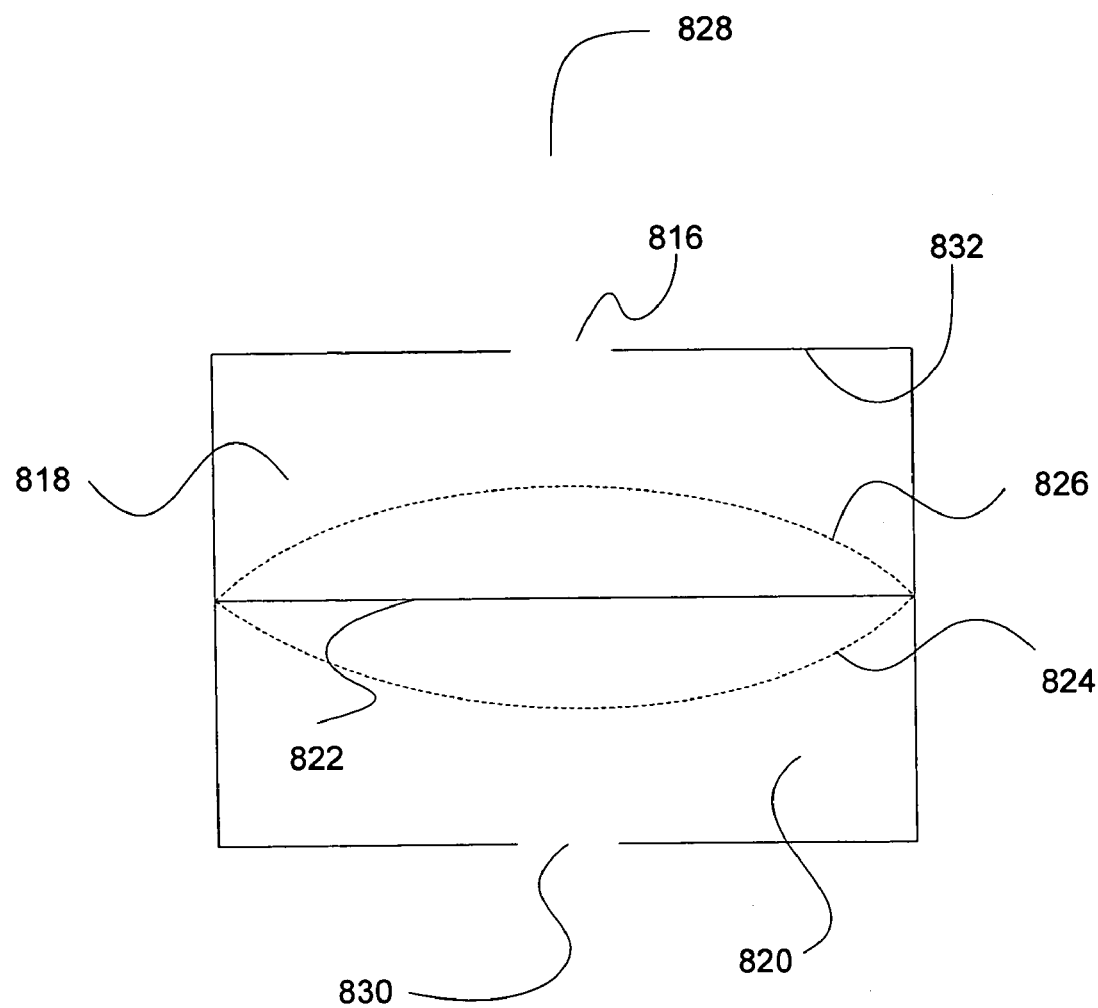
Figures 4, 8B:
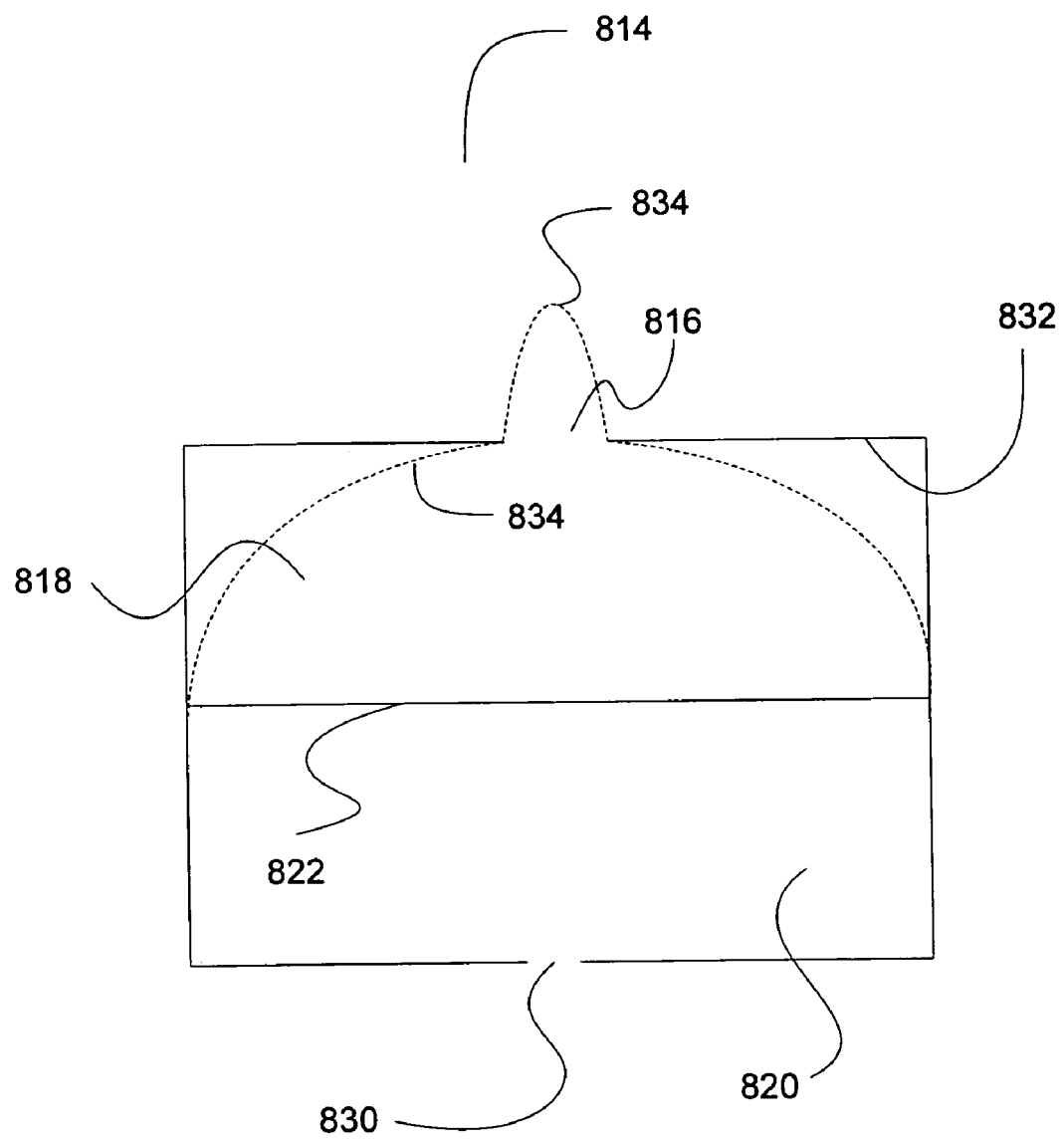

FIG. 8B-1 illustrates the use of an altimeter 812 in the hang-timer device 800. The altimeter 812, just as the magnetometer 810 in FIG. 8A, can be electrically coupled to the microprocessor 804. The processed data provided by the altimeter 812 can then be displayed, either in the form of pressure changes or speed information, such as rate of ascent or rate of descent, in the display 808 of the housing 802.

A special type of altimeter can be used to measure changes in altitude over short distances. It can be used to measure whether a hang-timer wearer is traveling up or down using small spatial intervals, and it can thus provide increased simulation realism. This altimeter can be a continuously resetting pressure sensor, with a reference chamber to equalize to local atmosphere slower than the rate of expected events, thereby providing for improved sensitivity over existing pressure sensors. For example, a typical altimeter with such a reference chamber can detect changes in pressure over small variations in altitude, on the order of less than one inch. Coupled with continuous resetting capability, for example, on the order of less than one second, such an enhanced altimeter could provide for increasingly accurate data.

In contrast to such an altimeter, FIG. 8B-2 illustrates one typical altimeter 814 used in the art. A typical altimeter 814 may be an atmospheric pressure sensor that detects the difference between ambient atmospheric pressure and the pressure of a reference chamber. It does this measuring the deflection of a mechanical structure, such as a diaphragm, that separates the reference chamber from the measured pressure.

Thus, in FIG. 8B-2, a typical altimeter 814 may comprise of an intake aperture 816 which lets in the ambient atmospheric pressure into an intake chamber 818. If there is a pressure difference between the intake chamber 818 and the reference chamber 820, the diaphragm 822 will flex in the direction away from the greater pressure—in whichever chamber it may be. Per FIG. 8B-2, if the pressure in the intake chamber 818 is greater than the reference pressure (e.g. 1 atmosphere) in the reference chamber 820, then the diaphragm 822 will bend down 824. If the reverse is true, then the diaphragm 822 will bend up 826.

By way of contrast, FIG. 8B-3 illustrates the enhanced, resetting altimeter 828 discussed above. This kind of altimeter 828, additionally, may have a resetting aperture 830. This aperture 830, as discussed above, allows the reference chamber 820 to reset to the ambient pressure over time. This resetting ensures that a sensitive diaphragm 822 will not expand too much during substantial altitude changes. For example, if the diaphragm 822 is sensitive to within a few feet (or even inches), the reference chamber 820 may reset every predetermined altitude change so that the diaphragm 822 does not hit the walls 832 of the altimeter 828 by expanding too much 834 (see FIG. 8B-4). Too great of an expansion could damage the diaphragm 822 or produce inaccurate results—or both.

Thus, the resetting aperture 830 may simply be a single, naked hole which is smaller than the intake aperture 816 (i.e. it can be a small air orifice). Being small in size, the resetting aperture 830 can restrict the movement of air more than the intake aperture 816. Alternatively, multiple small holes could similarly restrict incoming air. Yet in another aspect of the disclosed subject matter, in FIG. 8B-5, the resetting aperture 830 depicted in FIG. 8B-3 can be dammed with a porous substance 836. The dammed aperture 836 can further attenuate the rate of equalization between the intake chamber 818 and the reference chamber 820.

Figures 5, 8B:
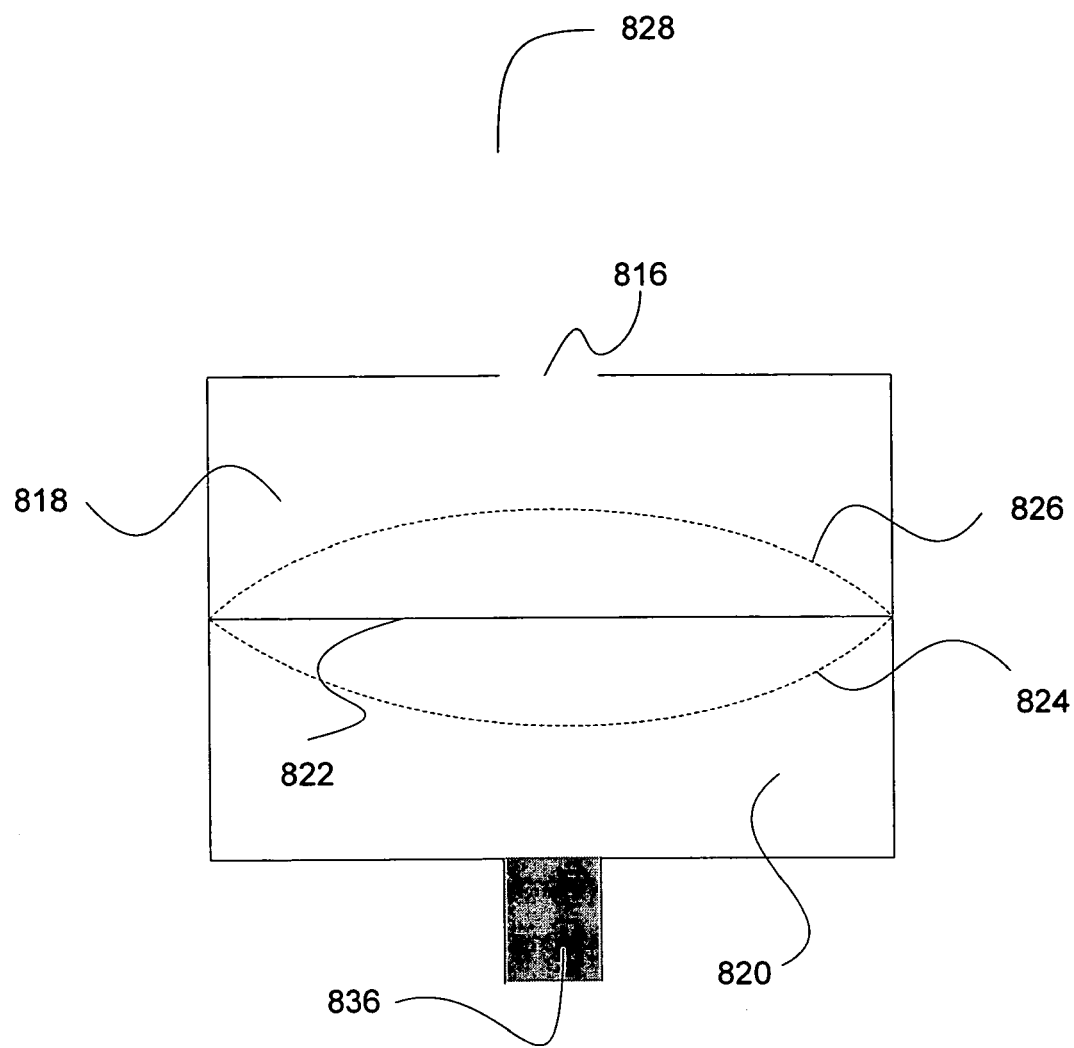
Figures 6, 8B:
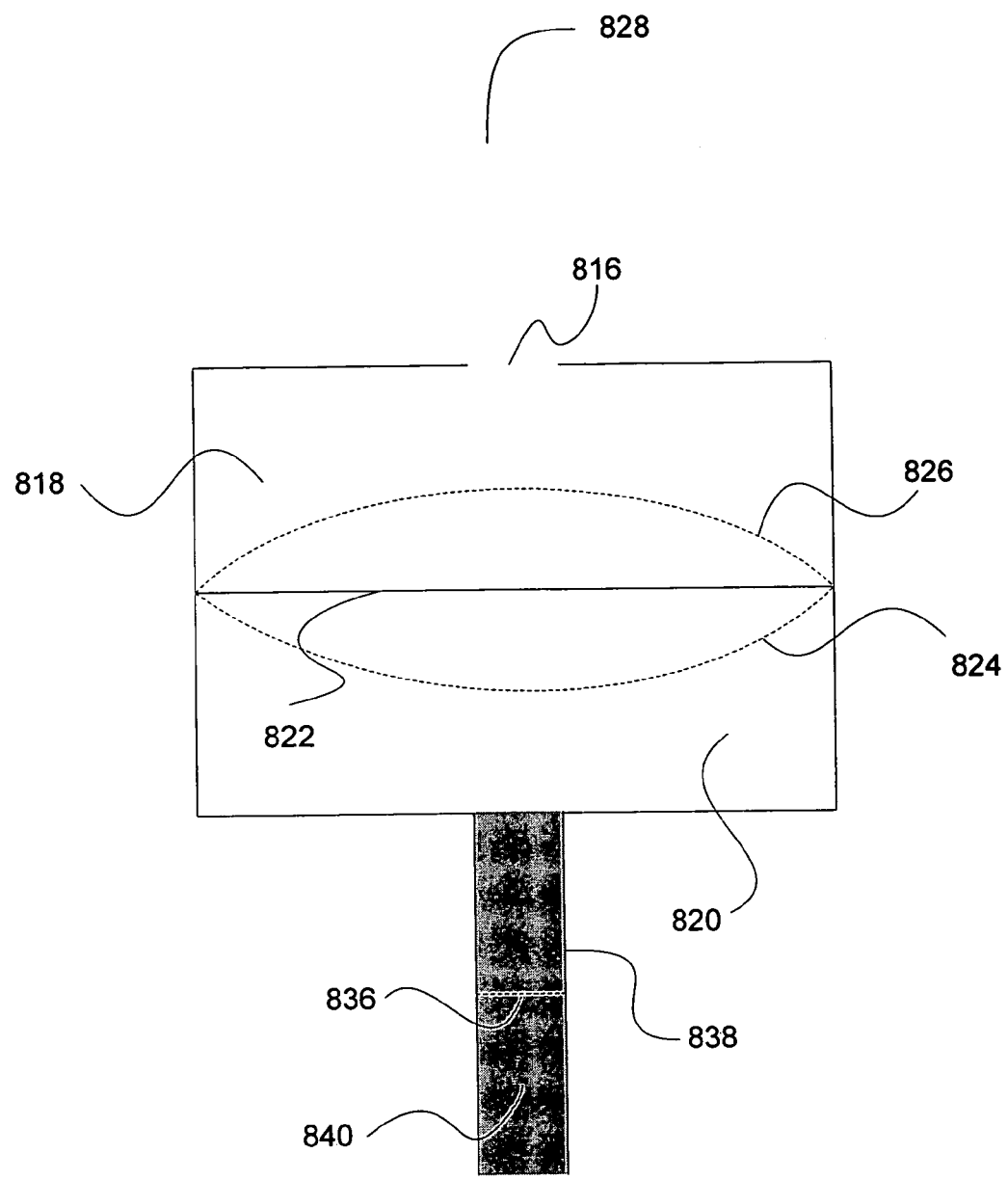

In yet another aspect, in FIG. 8B-6, the dammed aperture 836 of FIG. 8B-5 can comprise of a capillary tube 838 that contains a viscous liquid 840. Of course, those skilled in the art will readily appreciate the myriad of ways of implementing this presently disclosed subject matter. Numerous physical embodiments of the dammed aperture 836 can be implemented.

Figures 7, 8B:
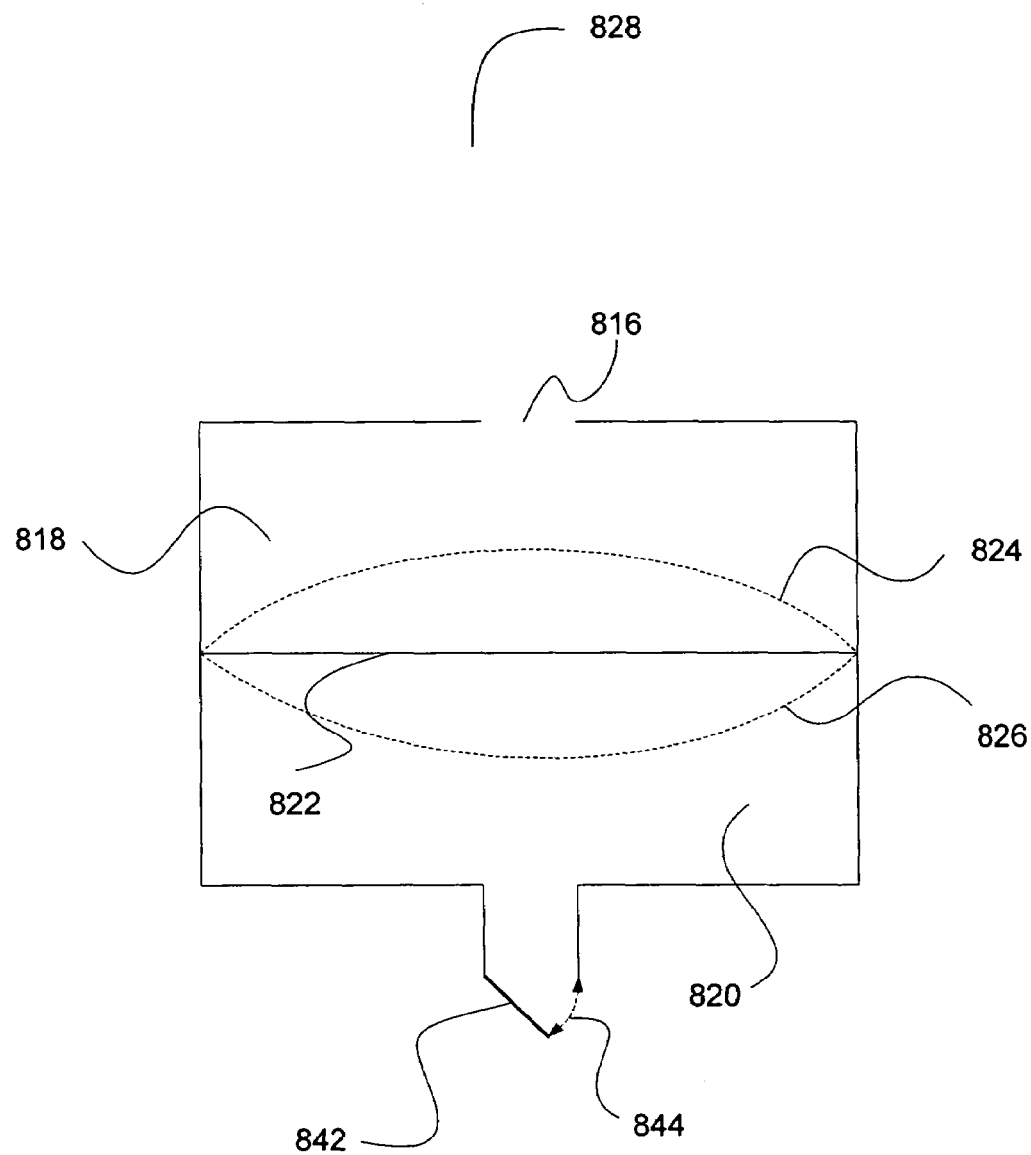

In still another aspect, FIG. 8B-7 illustrates that a flap or valve 842 can be used to reset 844 the enhanced altimeter 828 to ambient pressure. This valve 842 could be opened and closed 844 at predetermined intervals and for predetermined lengths of times. Opening and closing 844 the valve 842 would allow for almost instantaneous resetting, in contrast to the gradual resetting of the dammed aperture.

The advantages of the resetting altimeter 828, depicted in FIGS. 8B-3, 8B-5, and 8B-6, over a typical altimeter 814, depicted in FIGS. 8B-2 and 8B-4, are numerous. For example, a typical altimeter 814 may be limited for use in measuring changes in altitude of less than one inch in several ways: (1) The range is too broad, limiting precision; (2) hysteresis of the altimeter, with its broad ranges, limits accuracy; (3) barometric pressure changes require measurements with consideration for time; and (4) temperature changes can cause additional irregularities.

Typical altimeters 814, which rely on absolute atmospheric pressure sensors may have a range of around one atmosphere (0 to 14.5 psi) to cover a reasonable range of pressures the sensor may encounter. Often such sensors have a range of 0-15 psi to cover use at sea level +0.5 psi to allow for fluctuations in barometric pressure. This limits the precision of the pressure measurement.

Conversely, narrower sensor ranges of the resetting altimeter 828 will aid in measurement of smaller changes in altitude. In the case of the hang-timer, altitude differences greater than 100 ft may not be relevant. The accuracy of typically high-end sport watch altimeters with a 15 psi range may be about +/−0.2% corresponding to ~+/−60 ft change in altitude. For the hang-timer, measurement accuracies at equal to or less than 1 ft may be desired. If the range of the pressure sensor could be limited to 250 ft (or 0.125 psi) then the pressure sensor needs only to be +/0.5% accurate.

A continuously resetting pressure sensor 828 is not limited by any pressure extremes. Rather, the resetting pressure sensor 828 may be only limited by the rate in pressure change. In other words, the measured pressure can exceed the sensor's full scale pressure limit if the rate of change is less than the rate of equalization.

Rate of equalization could be set to maximize sensor precision and accuracy. This may entail making the pressure sensor's full-scale range as small as possible while considering the rate of expected events to be measured. For example, if such an altitude sensor is integrated in the hang-timer, and the wearer jumps off a cliff, then the maximum rate of pressure change corresponds to the hang-timer's expected terminal velocity.

The fastest rate of atmospheric pressure change for the hang-timer may be during free fall. Assuming the maximum terminal velocity for the hang-timer wearer to be 250 ft/s, then this (roughly) corresponds to an altitude rate of change of 0.125 psi/sec. Assuming a common low pressure sensor range of +/−1 psi, then the sensor needs to completely equalize in no more than (1 psi) per (0.125 psi/sec), in other words, 8 seconds.

Figures 8, 8B:
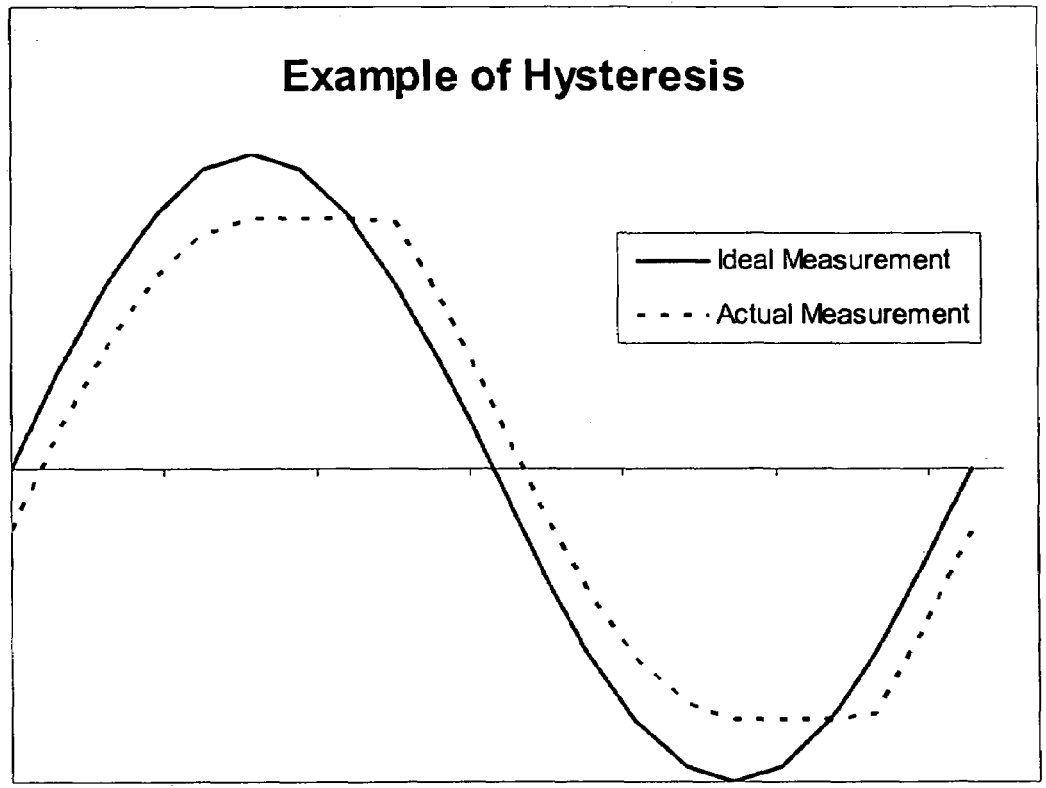

Furthermore, pressure sensors are typically subject to hysteresis from changes in pressure and temperature. The output will lag the input of a sensor when the deflection or temperature changes direction. Hysteresis can be measured as a percent error of the full measurement range. For example if the full range of a sensor is +/−10 psi and it has a hysteresis lag of +/−0.01 psi, it can be said the sensor has an inaccuracy due hysteresis of +/−1%. FIG. 8B-8 illustrates the difference between an ideal measurement and an actual measurement due to hysteresis.

Modern solid state pressure sensors can have cumulative inaccuracies due to hysteresis from pressure and/or temperature in excess of 2% of full scale span. This applies to pressure sensors large and small—regardless of the sensor's pressure range measurement. For the hang-timer, the maximum pressure range could equal the maximum expected pressure measurement.

Figure 8C:
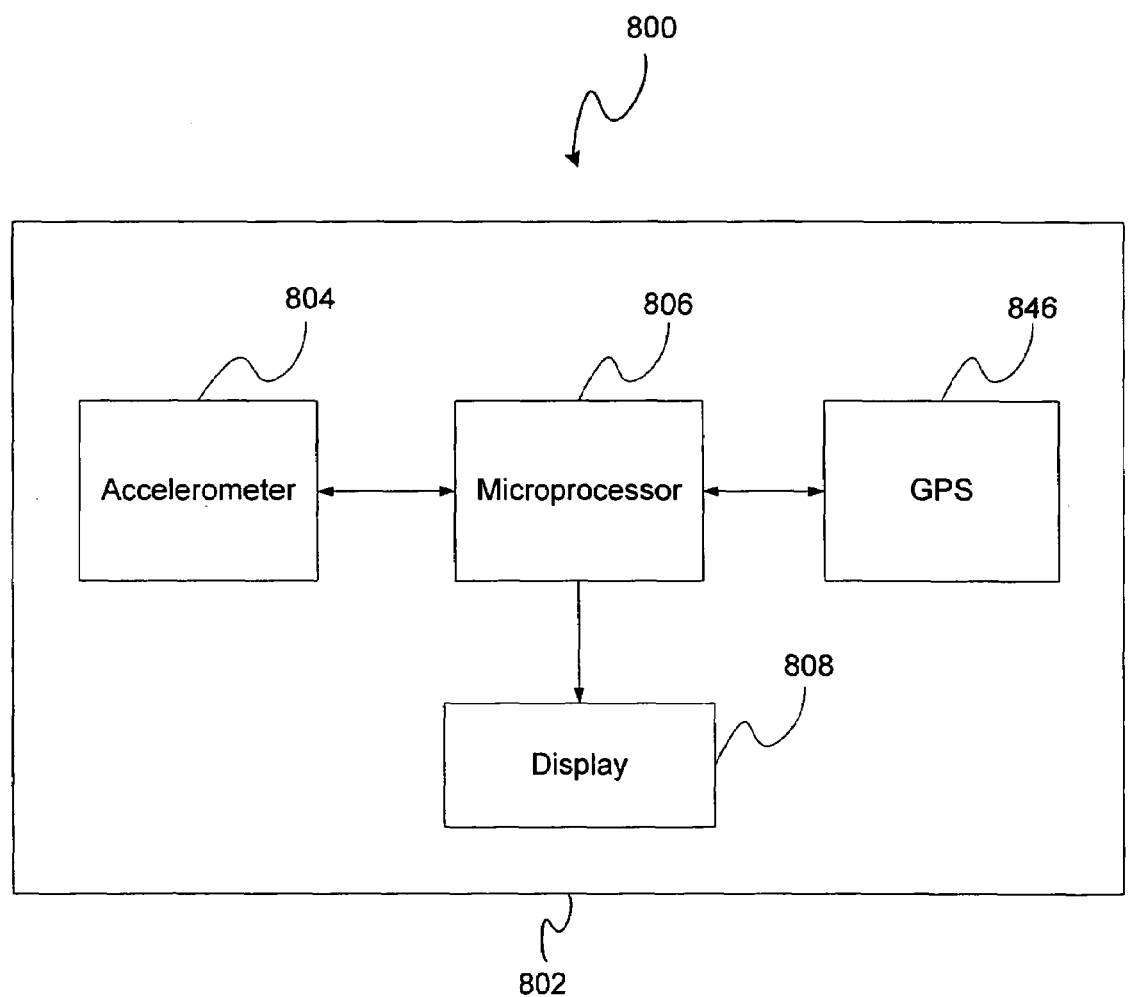
FIG. 8C shows a GPS device that can be used by the hang-timer.

Next, FIG. 8C illustrates that a global position system device (GPS) device 846 can be used by the hang-timer device 800. Like the magnetometer 810 and the altimeter 812, the GPS device 846 can be electrically coupled to the microprocessor 806 in order to provide position information. The GPS device 846 provides position data to the microprocessor 806, and upon processing of that data, position information of the hang-timer 800 wearer can be ascertained. Having position data of the hang-timer 800 wearer adds to the realism of the simulation of a wearer's actions in a gaming environment.

Figure 8D:
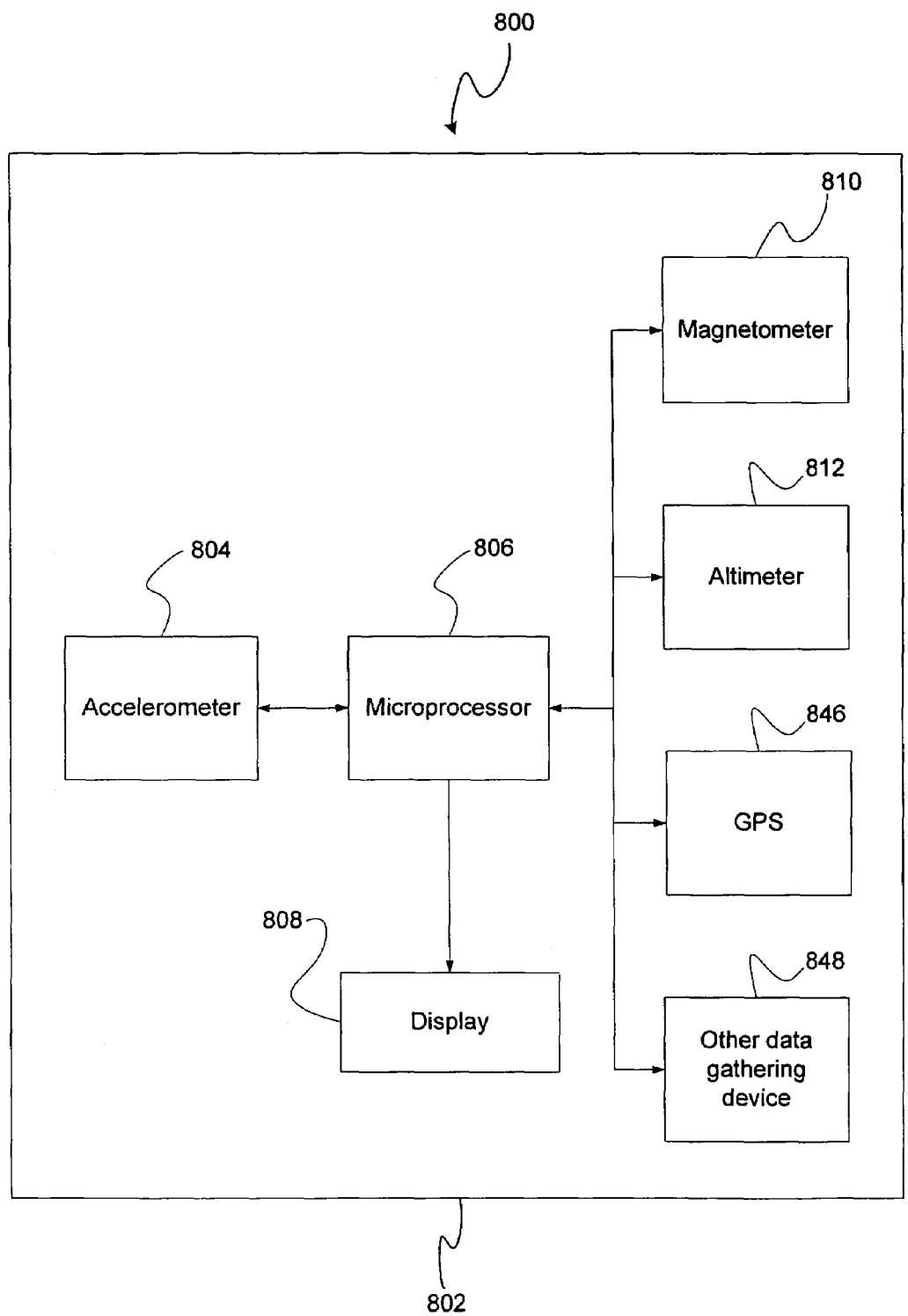
FIG. 8D shows that various data gathering devices can be used together or in various combinations in order to obtain more accurate information regarding the actions of the wearer of a hang-timer device.

FIG. 8D illustrates that various data gathering devices can be used together or in various combinations in order to obtain more accurate information regarding the actions of the wearer of a hang-timer device. Thus, in FIG. 8D, a magnetometer 810, a altimeter 812, a GPS device 846, and any other data gathering device 848 capable of enhancing information regarding a hang-timer 800 wearer can be coupled to the microprocessor 806. Of course, these devices are provided in addition to the accelerometer 804 that provides hang-time data in the first place. However, any of these devices 810, 812, 846, and 848 can be used in any combination desired either by a hang-timer wearer or a hang-timer programmer or manufacturer.

Figure 9A:
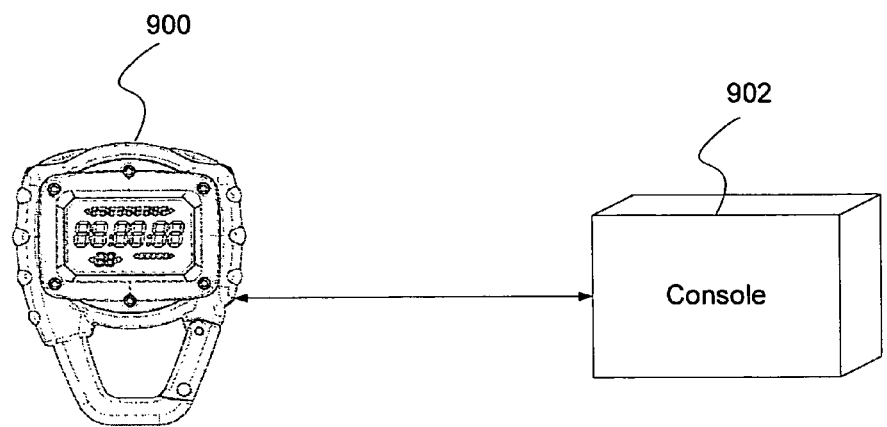
FIG. 9A shows direct coupling of a hang-timer device and a game console.
Figure 9B:
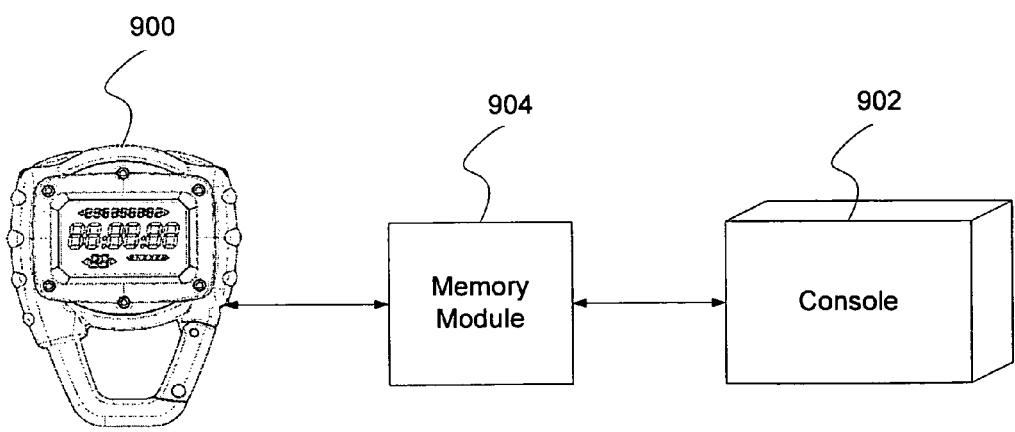
FIG. 9B shows a memory module that is external to a hang-timer, where the memory module can provide data from the hang-timer to a game console.

Once all the relevant type of data (i.e. orientation data, position data, speed data, hang-time data, etc.) discussed above is gathered, it can be stored in a memory module. FIGS. 9A and 9B illustrate different memory module paradigms. FIG. 9A illustrates a hang-timer device 900 that is directly coupled to a game console 902. In this scenario, the relevant data is stored internally in the hang-timer 900.

However, in an alternative aspect, data can be stored to an external memory module which is removed from a hang-timer and then connected to a game console. This memory module may comprise of flash memory or any other such equivalent device. Thus, according to FIG. 9B, data obtained by the hang-timer 900 is stored to an external (to the hang-timer 900) memory module 904. Once the memory module 904 is removed from the hang-timer 900, it can then be attached to the game console 902 and provide the game console 902 with the relevant data. Such data can then be played by the game console 902 to simulate in virtual space whatever the wearer of the hang-timer 900 was doing in real space.

Figure 10:
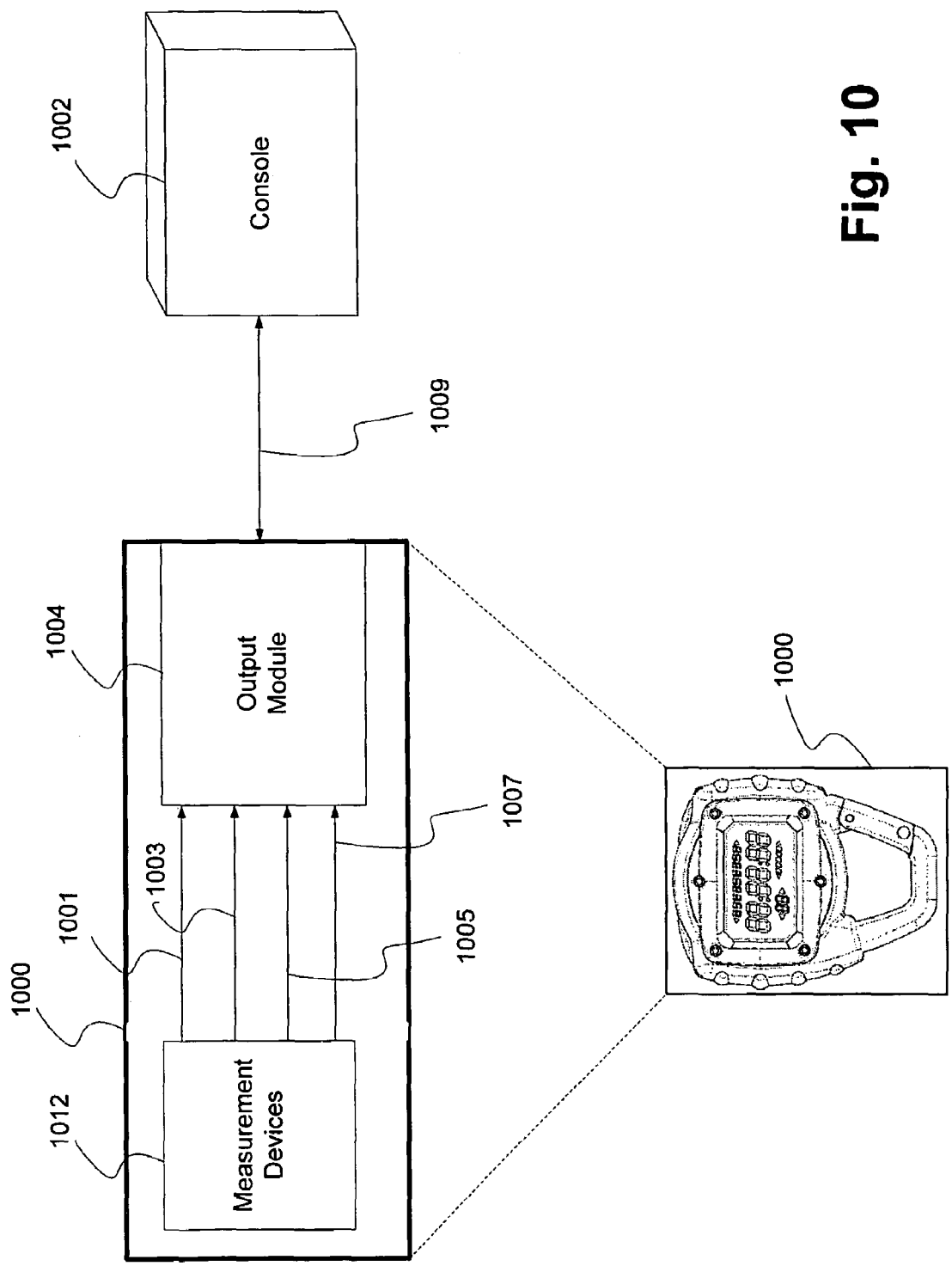
FIG. 10 illustrates an external output module that provides data from a hang-timer device to a game console.

Next, per FIG. 10, in order for data obtained by the hang-timer 1000 to be useful for a game console 1002, it may be characterized properly and presented via some kind of output module 1004 that is a part of the hang-timer 1000. FIG. 10 illustrates an output module 1004 that takes-in data from the measurement devices 1012 of the hang-timer 1000 and provides them to a game console 1002. The measurement devices 1012 may provide various types of data that describe the hang-time event of a wearer of the hang-timer. For example, such data includes but is not limited to: orientation of the wearer 1001; position of the wearer 1003; the speed of the wearer 1005; and/or the actual hang-time of the wearer 1007.

This data 1001, 1003, 1005, and 1007 can be received by an output module 1004 from the measurement devices 1012, and be presented to a console 1002 in such a fashion that the output data 1009 is intelligible to the console 1002 and follows the required protocols of the console 1002. The output data 1009 to the console 1002, can be characterized either in real time as it is being downloaded from the hang-timer device 1000 to the console 1002, or it may by characterized off-line first and then downloaded to the console 1002. The type of characterization that will be chosen will depend on numerous technological considerations, such as hardware capacity, as those of ordinary skill in the art will appreciate.

The output module 1004 may also provide simulation software such that the data of interest can be processed by the simulation software and provided via a port to the console 1002. Thus, the simulation software can, in short, act as any ordinary game would behave, and virtually recreate the in the console 1002 the original actions that the hang-timer 1000 wearer performed on the snow slopes or in other environments.

Figure 11:
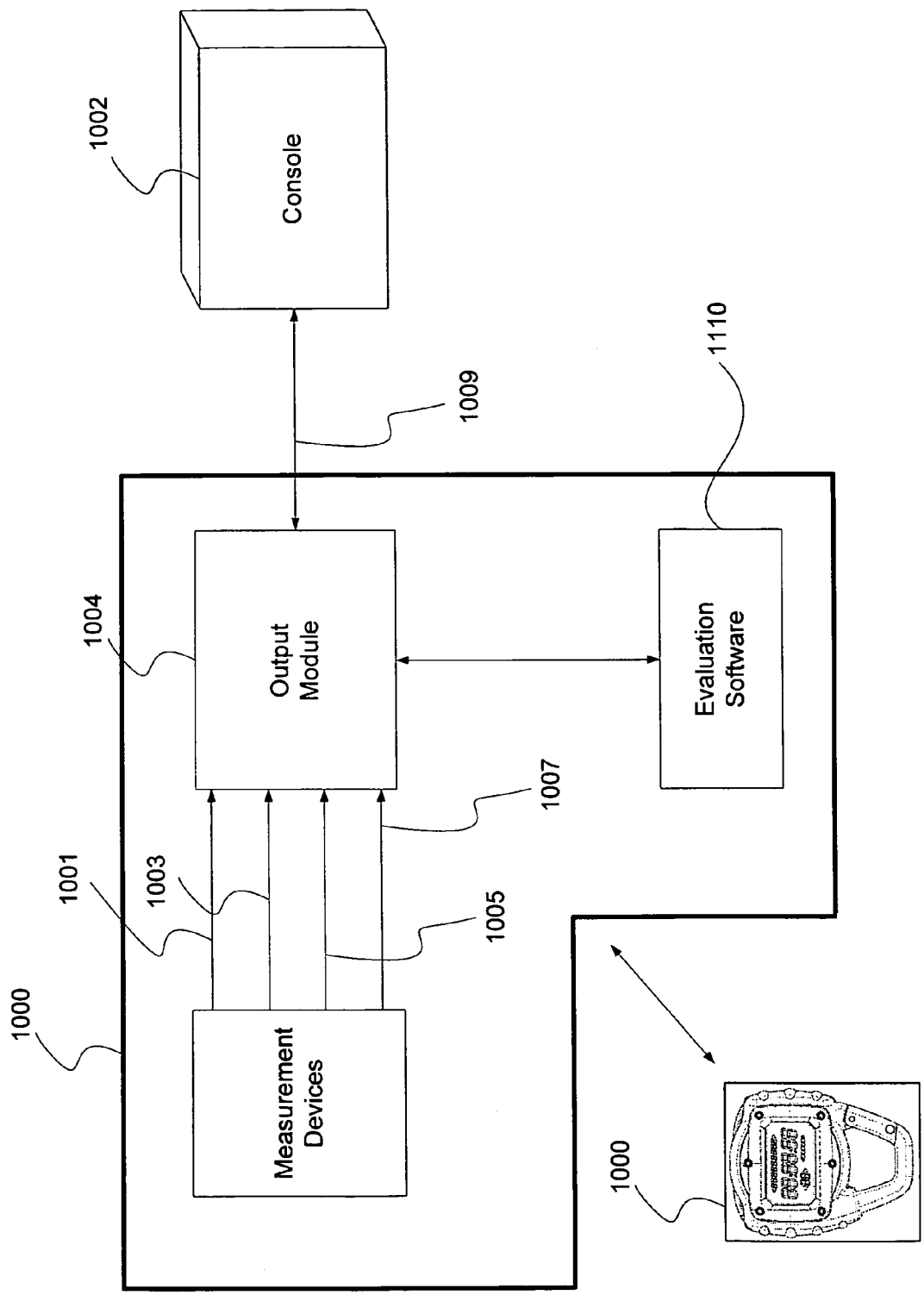
FIG. 11 illustrates evaluation software that can be introduced to enhance the information received by the console.

In an additional aspect of the present subject matter, FIG. 11 illustrates evaluation software 1110 that can be introduced to enhance the information received by the console 1002. Evaluation software 1110 may entail a scoring algorithm that assigns a score to a hang-time event. For example, the best score possible could receive a perfect 10, and other scores on a scale of 0 to 10 could be assigned to each hang-time event—or, alternatively, scores could be assigned on a user-by-user basis. Additionally, both the output module 1004 and the evaluation software 1110 can be stored inside the hang-timer 1000 (as illustrated by the solid black line around these components) to provide internal characterization and evaluation capability.

Figure 12:
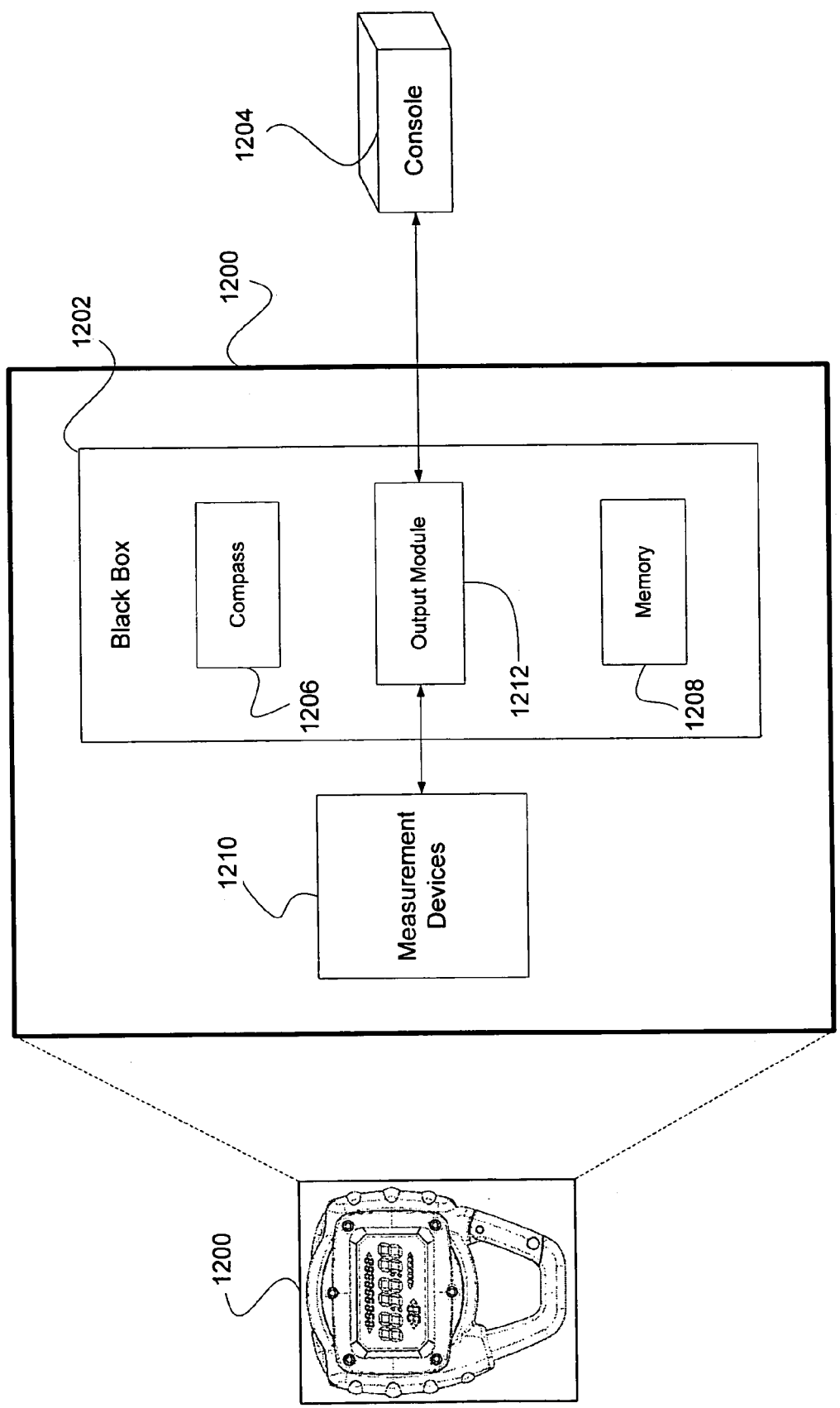
FIG. 12 illustrates a black box implementation of exemplary devices useful in game console simulation.

Next, FIG. 12 illustrates a black box 1202 implementation of exemplary devices useful in game console 1202 simulation set-up. The notion of a "black box" 1202 entails having the ability to provide useful information by gathering, recording, and reproducing data. Thus, the black box 1202 in FIG. 12 has a compass 1206 to gather orientation data and a memory module 1208 to record that gathered data—in addition to the hang-time data that is typically gathered by the hang-timer 1200 via some measuring devices 1210, as discussed in the previous section of the present disclosure. Via the output module 1212, this data can then be reproduced in the console 1204. The black box, of course, can have more devices than are depicted in FIG. 12. As mentioned above, magnetometers and GPS devices, among many, can be used in the black box 1202.

Figure 13:
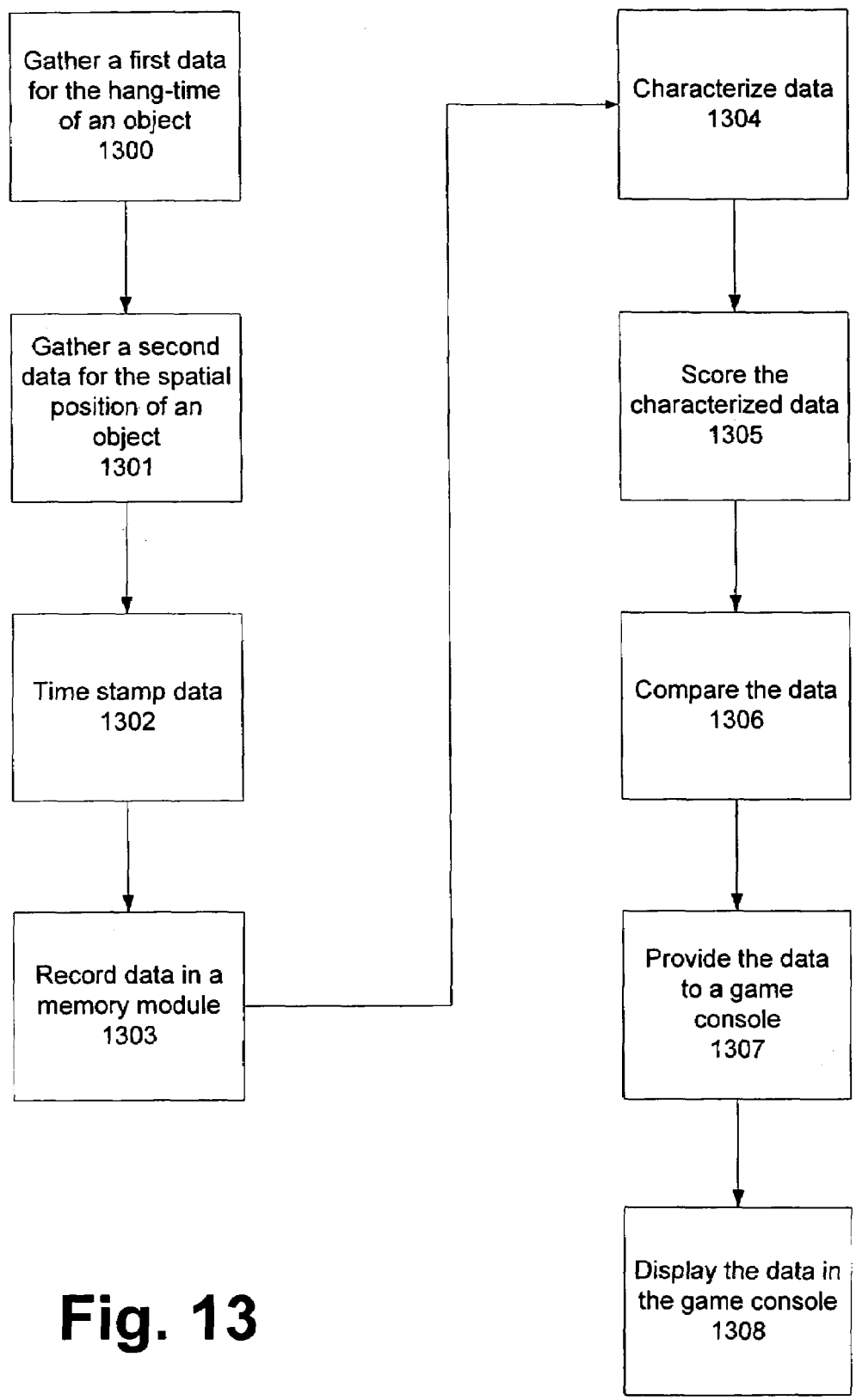
FIG. 13 presents a block style flow chart depicting a typical implementation of the disclosed subject matter.

Lastly, a block flow diagram is provided in FIG. 13 of an exemplary implementation of the present subject matter. At block 1300, a first data is gathered using an accelerometer, where the accelerometer is configured to measure the static acceleration of the wearer (or more broadly, the object, which may be a vehicle contiguous with the wearer and yet separate from the wearer) of the hang-timer—thus measuring the hang-time or the time the object is airborne. Similarly, at block 1301, a second data is gathered using some kind of data gathering device, such as a magnetometer, an altimeter, or a global positioning device, such that the data gathering device is configured to measure some spatial movement of the object, whether the spatial movement is up or down (as measured by an altimeter), around some axis substantially perpendicular to the surface of the earth, whether north, south, east, or west (as measured by a compass), or from one place to another (as measured by a global positioning device).

As data is being gathered, at block 1302, it can be time stamped. Time stamping allows for simulation of the object in the game console according to a desired temporal order, whether the order is reproduced in the exact same time sequence as it occurred or in a different pre-determined time sequence. Time stamping can be performed on an hang-time event by hang-time event basis, or alternatively, it can be performed on a run-by-run basis, where a run may comprise of one or multiple hang-time events.

Once the data is time stamped, it can be recorded (alternatively, the data can be recorded first and then time stamped). Thus, at block 1303, the data is recorded in some memory module, such as flash memory. As mentioned above with reference to FIGS. 9A and 9B, such a memory module can be internal or external to a hang-timer device.

Once the data is recorded, it can then be characterized, at block 1304, by some software into relevant data and not relevant data. The data is relevant from the point of view of a game console, as to the type of data that is relevant for simulation. Either the hang-timer user, the hang-timer developer, or a hang-timer administrator can make a policy decision as to which data is relevant and which data is not relevant.

Upon characterization of the relevant data, such data can be evaluated for some score assignment. For example, each hang-time event or each run can be scored on a scale of 1 to 10, as is indicated at block 1305. The scoring can be done internally to the hang-timer or it can be performed by an external module to which the hang-timer provides data. Additionally, the data can be compared to the data of another hang-time event or to another hang-timer wearer or object, as is indicated at block 1306. Such a comparison allows for the assessment of performance of the object in relation to the another object.

When the data has been gathered, recorded, stamped, characterized, and evaluated, it can finally be provided, at block 1307, to a game console for simulation. Finally, at block 1308, the data can be displayed at a game console. The more data that is provided to a game console, the more accurate the simulation will be. Although, as mentioned above, even provided minimal data will suffice since software algorithms can be developed to interpolate any interstices between data points. Such data can be provided using an external output module of the type described above.

While the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, an enhanced hang-timer for game console simulation was discussed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A device for recording data indicative of the motion of an object during a hang-time event in which the object is in a free fall condition, comprising:
    an accelerometer configured to detect the free fall condition based on a measured static acceleration of about 0 g, and to generate first data indicating that the object is experiencing the hang-time event;
    a compass configured to measure a spatial orientation of the object during the hang-time event and to generate second data indicative of the spatial orientation of the object during the hang-time event, wherein the compass is configured to measure the spatial orientation of the object relative to the magnetic field of the earth;
    a processor communicatively coupled with the accelerometer and the compass and configured to determine the hang-time of the object during the hang-time event;
    a memory module communicatively coupled with the processor for storing the first data and the second data; and
    an output module configured to communicate with the memory module and configured to communicate with a game console, such that the output module provides at least one of the first data and the second data to the game console, wherein the game console is capable of simulating said motion of the object, including at least the hang-time and spatial orientation, in a game environment.

2. The device according to claim 1, wherein the compass measures at least one of the relative orientation of the object and the absolute orientation of the object.

3. A device for gathering, recording, and providing data about an object to a game console for simulation of the object in the game console, comprising:
    an accelerometer configured to measure the static acceleration of the object, wherein the accelerometer is configured to generate first data for a hang-time event;
    an altimeter configured to measure a spatial movement of the object during the hang-time event and to generate second data, wherein the altimeter is configured to measure the altitude of the object by measuring changes in the ambient pressure during the spatial movement of the object;
    a processor communicatively coupled with at least the accelerometer and the altimeter to determine the hang-time of the object during the hang-time event;
    a memory module configured to store at least one of the first data and the second data; and
    an output module configured to communicate with the memory module and configured to communicate with the game console, such that the output module provides at least one of the first data and the second data to the game console for simulation of the object based on the hang-time event, in a game environment.

4. The device according to claim 3, wherein the altimeter is configured to reset at predetermined intervals and for predetermined periods of time.

5. The device according to claim 4, wherein the altimeter uses a resetting aperture to reset pressure in its reference chamber, wherein the resetting is accomplished by using one of a viscous fluid, a valve, and a small air orifice.

6. The device according to claim 3, further comprising a global positioning system device that measures the position of the object on the earth.

7. The device according to claim 3, wherein the memory module is internal to the device.

8. The device according to claim 3, wherein the memory module is external to the device.

9. A device allowing for simulation of at least one object based on measured data, comprising:
    an accelerometer configured to measure the static acceleration of the object during a hand-time event;
    an altimeter configured to measure atmospheric pressure during the hand-time event; and
    at least one memory module configured to store values measured by said accelerometer and said altimeter, and to provide measured values to a game console for simulation of the object during the hang-time event, in a game environment;
    wherein the altimeter uses a resetting aperture to reset pressure in its reference chamber, and wherein the resetting is accomplished by using one of a viscous fluid or a valve.

10. A method for recording data indicative of the motion of an object during a hang-time event in which the object is in a free fall condition, comprising:
    using an accelerometer to detect the free fall condition based on a measured static acceleration of about 0 g, and to generate first data indicating that the object is experiencing the hang-time event;

using a data gathering device comprising at least one of (a) a digital compass, and (b) an altimeter, to measure at least one of a spatial orientation or movement of the object, and generating second data indicative of said spatial orientation or movement;

recording the first data and the second data and storing the first and second data in a memory module; and providing at least one of the first data and second data to the game console for simulation of the object, wherein the game console is capable of simulating said motion of the object, including the hang-time and at least one of the spatial orientation or movement of the object, in a game environment.

11. The method according to claim 10, farther comprising characterizing at least one of the first data and the second data as a relevant data for use in the game console.

12. The method according to claim 10, further comprising time stamping at least one of the first data and the second data.

13. The method according to claim 12, wherein the time stamping allows for simulation of the object in the game console according to a temporal order.

14. The method according to claim 12, wherein the time stamping is performed on an hang-time event by hang-time event basis.

15. The method according to claim 12, wherein the time stamping is performed on a run-by-run basis, wherein a run comprises at least one hang-time event.

16. A method for gathering, recording, and providing data about an object to a game console for simulation of the object in the game console, comprising:

gathering a first set of data using an accelerometer configured to measure the static acceleration of the object for use in determining a hang-time of the object during a hang-time event;

gathering a second set of data using a data gathering device comprising at least one of (a) a digital compass, and (b) an altimeter, wherein the data gathering device is configured to measure a spatial movement of the object;

recording at least one of the first and second sets of data;

providing at least one of first and second sets of data to a the game console for simulation of the object, in a game environment; and evaluating at least one of the first gat-a and second sets of data for a score assignment.

17. A method for gathering, recording, and providing data about an object to a game console for simulation of the object in the game console, comprising:

gathering a first set of data using an accelerometer configured to measure the static acceleration of the object for use in determining a hang-time of the object during a hang-time event:

gathering a second set of data using a data gathering device comprising at least one of (a) a digital compass, and (b) an altimeter, wherein the data gathering device is configured to measure a spatial movement of the object;

recording at least one of the first and second sets of data;

providing at least one of first and second sets of data to a the game console for simulation of the object, in a game environment; and comparing at least one of the first gat-a and second sets of data to another set of data associated with another object.

18. A method for gathering, recording, and providing data about an object to a game console for simulation of the object in the game console, comprising:

gathering a first set of data using an accelerometer configured to measure the static acceleration of the object for use in determining a hang-time of the object during a hang-time event;

gathering a second set of data using a data gathering device comprising at least one of (a) a digital compass, and (b) an altimeter, wherein the data gathering device is configured to measure a spatial movement of the object;

recording at least one of the first and second sets of data;

providing at least one of first and second sets of data to a the game console for simulation of the object, in a game environment; and gathering, recording, and providing another data set about another object, and providing the another data set to the game console for simulation, in a game environment.

* * * * *

UNITED STATES PATENT AND TRADEMARK OFFICE
CERTIFICATE OF CORRECTION

PATENT NO. : 7,650,257 B2
APPLICATION NO. : 11/286092
DATED : January 19, 2010
INVENTOR(S) : Alexander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Twenty-third Day of November, 2010

David J. Kappos
*Director of the United States Patent and Trademark Office*